United States Patent
Ogasawara

(10) Patent No.: US 7,307,769 B2
(45) Date of Patent: Dec. 11, 2007

(54) HOLOGRAM RECORDING MEDIUM, RECORDING/REPRODUCING METHOD AND RECORDING/REPRODUCING APPARATUS

(75) Inventor: Masakazu Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 266 days.

(21) Appl. No.: 11/046,799

(22) Filed: Feb. 1, 2005

(65) Prior Publication Data

US 2005/0179967 A1    Aug. 18, 2005

(30) Foreign Application Priority Data

Feb. 13, 2004    (JP)    ............... 2004-036545

(51) Int. Cl.
*G03H 1/28*    (2006.01)
(52) U.S. Cl. ................. 359/24; 359/25; 369/279
(58) Field of Classification Search ........... 359/24, 359/22, 25; 369/279
See application file for complete search history.

(56) References Cited

U.S. PATENT DOCUMENTS 5,671,073 A  *  9/1997  Psaltis et al. ............... 359/22

FOREIGN PATENT DOCUMENTS

| JP | 2002-40908 | 2/2002 |
|----|------------|--------|
| JP | 2003-85768 | 3/2003 |

OTHER PUBLICATIONS

D. Psaltis et al., "Holographic storage using shift multiplexing," *Optics Letters*, vol. 20, No. 7, Apr. 1, 1995, pp. 782-784.

* cited by examiner

*Primary Examiner*—Alessandro Amari
(74) *Attorney, Agent, or Firm*—Drinker Biddle & Reath LLP

(57) ABSTRACT

A hologram recording medium is for recording or reproducing information with light irradiated thereto. The medium has a recording layer made of a photo-sensitive material, a reflective layer disposed on the opposite side of the recording layer from a light irradiated side, tracks formed on the reflective layer such that the tracks are spaced apart by a first pitch from each other to extend without intersection, and positioning marks formed on the reflective layer such that the positioning marks are spaced apart by a second pitch from each other in a direction in which the tracks extend. The second pitch is a function of the first pitch.

15 Claims, 20 Drawing Sheets

HOLOGRAMS

RADIAL DIRECTION

TANGENTIAL DIRECTION

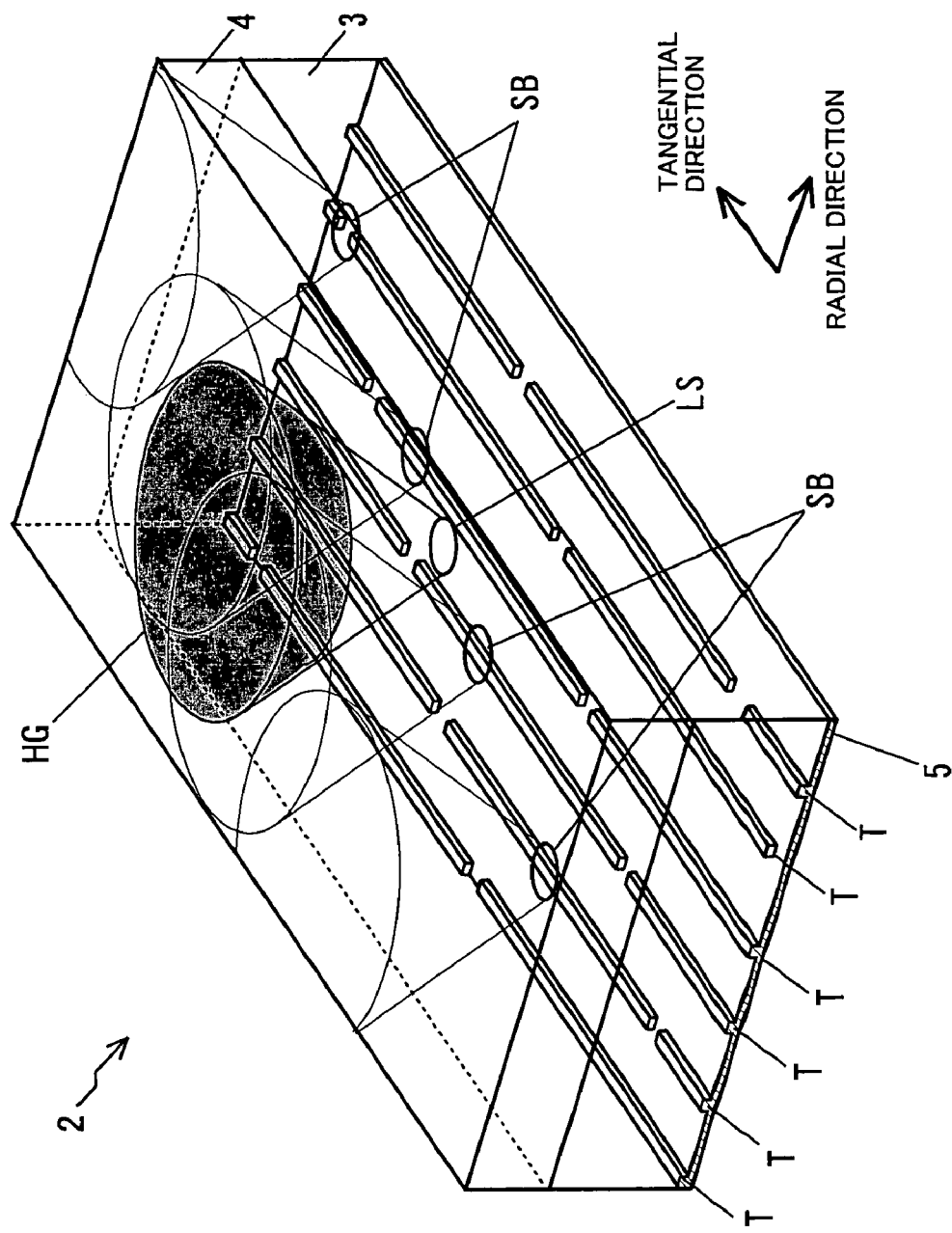

FIRST LAYER

SECOND LAYER

THIRD LAYER

FOURTH LAYER

HOLOGRAM RECORDING MEDIUM, RECORDING/REPRODUCING METHOD AND RECORDING/REPRODUCING APPARATUS

BACKGROUND OF THE INVENTION

1. Field of the Invention

The present invention relates to a hologram recording medium such as an optical card with which information is optically recorded or reproduced, and more particularly, to a hologram recording medium which has a recording layer irradiated with an optical beam for recording information thereon or reproducing information therefrom, and a recording/reproducing method and a recording reproducing apparatus.

2. Description of the Related Art

A hologram has drawn attention because of its ability to record two-dimensional data at a high density, for use in high density information recording. The hologram is characterized by volumetrically recording a light wavefront, which carries recording information, on a hologram recording medium made of a photosensitive material such as a photo-refractive material as a change in refractive index. Multiplex recording on the hologram recording medium can dramatically increase the recording capacity. The multiplex recording is classified into angle multiplexing, phase coding multiplexing, and the like. Even in a multiplexed hologram region, information can be recorded multiple times by changing the incident angle or phase of interfering light waves.

A hologram recording method for increasing the recording density through a plurality of times of shift multiplex recording records holograms such that adjacent holograms are overlapped in sequence, as shown in FIG. 1 (see, Laid-open Japanese Patent Application No. 2002-40908). According to this method, the holograms are recorded in the form of sets of columns in which the centers of the holograms are spaced apart by 2 to 50% of their diameter from one another. In this recording method, a first set of holograms are recorded such that the respective holograms are tangential to each other (FIG. 1A). A second set of holograms are recorded on the first set of holograms such that the holograms in the second set are displaced from the holograms in the first set by 50% of their diameter, respectively (FIG. 1B). A third and a fourth set of holograms are recorded tangential to the first and second sets of hologram columns and are overlapped in a similar manner to the first and second sets of holograms (FIG. 1C). A fifth and a sixth set of holograms are recorded along a boundary between the first and second sets of hologram columns and the third and fourth sets of hologram columns, and are overlapped in a similar manner to the first and second sets of holograms (FIG. 1D).

In this conventional hologram recording method, when holograms are recorded such that they are overlapped at a narrow pitch equal to 50% of their diameter, the holograms are overlapped in excessively large portions. As the overlap writing is repeated a number of times, signals of adjacent holograms may be erased, or cross-talk may occur upon reading, though the method is intended to reduce a physical change problem. Data may not be successfully reproduced due to overwritten holograms. Further, since holograms cannot be precisely recorded in repetition, the holograms differ in pitch from one another, resulting in different diffraction efficiencies of the respective holograms.

On the other hand, an optical information recording apparatus has been developed for recording information at an ultra high density using the hologram recording medium as a disk (see, for example, Laid-open Japanese Patent Application No. 2003-85768). For recording an interference fringe pattern of a hologram, a proper exposure time and energy are required in a relative static state of the hologram recording medium and writing light, so that this prior art provides a method of continuing to precisely expose the moving hologram recording medium at a recording position thereof.

The conventional hologram recording medium includes servo areas 6 radially arrayed in a linear form at predetermined angular intervals, as shown in FIG. 2. Sector sections between adjacent servo areas 6 define data areas 7. For conducting a tracking servo control, the servo areas 6 and data areas 7 are formed with grooves on a track-by-track basis which function as guides. At least one lockup pit 8 has been previously recorded in the data area 7 in the form of an emboss pit or the like, so that even if an optical head is scanning the data area 7, a misalignment is detected between the lockup pit 8 and a position irradiated with a tracking servo light beam.

Likewise, with this optical information recording apparatus, when holograms are recorded, for example, such that they are overlapped at a narrow pitch equal to 50% of their diameter, signals of adjacent holograms may be erased, and cross-talk may occur upon reading, if the overlap writing is repeated a number of times.

Conventionally, hologram recording positions are sequentially displaced such that holograms overlap with one another to record the holograms in the form of a column, and the next hologram column is recorded to overlap the previous one, so that the previous overlapping holograms can cause a change in the intensity of next incident light, when it reaches the disk, thereby preventing optimal recording at constant recording power.

Particularly critical is a degraded quality of reproduced signals in adjacent hologram columns in a direction perpendicular to a direction in which the holograms extend. Also, the normal shift multiplexing hologram recording requires to precisely control a recording time for each hologram to be recorded. For this reason, a complicated control is required for maintaining a diffraction efficiency, including a recording scheduling arranged for an overall hologram recording medium.

SUMMARY OF THE INVENTION

It is therefore an exemplary object of the present invention to provide a hologram recording medium, a recording/reproducing method, and a recording/reproducing apparatus which are capable of precisely performing multiplex recording a plurality of times, and stably recording or reproducing information.

A hologram recording medium according to the present invention is a hologram recording medium for recording or reproducing information with light irradiated thereto, which is characterized by including:

a recording layer made of a photo-sensitive material;

a reflective layer disposed on the opposite side of the recording layer from a light irradiated side;

tracks formed on the reflective layer such that the tracks are spaced apart by a first pitch from each other to extend without intersection; and positioning marks formed on the reflective layer such that the positioning marks are spaced apart by a second pitch from each other in a direction in which the tracks extend, the second pitch being a function of the first pitch.

A recording/reproducing apparatus according to the present invention is a recording/reproducing apparatus for a hologram recording medium which is carried by a substrate and has a recording layer for recording or reproducing information with light irradiated thereto, characterized in that:

the hologram recording medium comprises a recording layer made of a photo-sensitive material, a reflective layer disposed on the opposite side of the recording layer from a light irradiated side, tracks formed on the reflective layer such that the tracks are spaced apart by a first pitch from each other to extend without intersection, and positioning marks formed on the reflective layer such that the positioning marks are spaced apart by a second pitch from each other in a direction in which the tracks extend, where the second pitch is a function of the first pitch; and the recording/reproducing apparatus includes means for irradiating a light beam to detect the positioning marks, and means for moving a position irradiated with the light beam in a direction having a component in a direction in which the tracks extend.

A reproducing apparatus according to the present invention is a reproducing apparatus for a hologram recording medium which is carried by a substrate and has a recording layer for recording or reproducing information with light irradiated thereto, characterized in that:

the hologram recording medium comprises a recording layer made of a photo-sensitive material, a reflective layer disposed on the opposite side of the recording layer from a light irradiated side, tracks formed on the reflective layer such that the tracks are spaced apart by a first pitch from each other to extend without intersection, and positioning marks formed on the reflective layer such that the positioning marks are spaced apart by a second pitch from each other in a direction in which the tracks extend, where the second pitch is a function of the first pitch; and the reproducing apparatus includes means for irradiating a light beam to detect the positioning marks, and means for moving a position irradiated with the light beam in a direction having a component in a direction in which the tracks extend.

A recording method for a hologram recording medium according to the present invention is a recording method for a hologram recording medium carried by a substrate and having a recording layer for recording or reproducing information with light irradiated thereto, characterized by comprising the step of temporally overlapping one or more layers each including a plurality of holograms to record a group of holograms on each of the layers, wherein the holograms are recorded on each of the layers at a density lower than a maximum recording density.

A hologram recording method according to the present invention is a hologram recording method for forming a light interference pattern on a hologram recording medium to record information thereon, characterized by comprising:

an interference beam formation step for generating an interference beam by causing a signal beam spatially modulated by an information pattern which carries the information to interfere with a reference beam; and a recording step for completing recording by executing a plurality of times a recording sequence including irradiating the interference beam onto a recording surface of the hologram recording medium to form a group of a plurality of holograms each corresponding to the information pattern, wherein in the recording step, different modulation conditions are set for at least one of the signal beam and the reference beam in one recording sequence and the subsequent recording sequence immediately after the one recording sequence.

BRIEF DESCRIPTION OF THE DRAWINGS

The aforementioned aspects and other features of the invention are explained in the following description, taken in connection with the accompanying drawing figures wherein:

FIG. 3 is a partial perspective view generally showing a track structure on a hologram disk according to one embodiment of the present invention;

DETAILED DESCRIPTION OF THE INVENTION

Figure 1A:
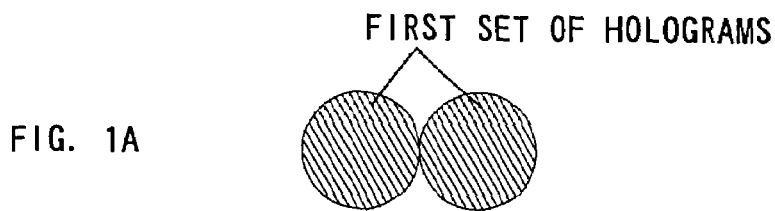
FIG. 1 is a schematic diagram showing a conventional hologram recording method.
Figure 1B:
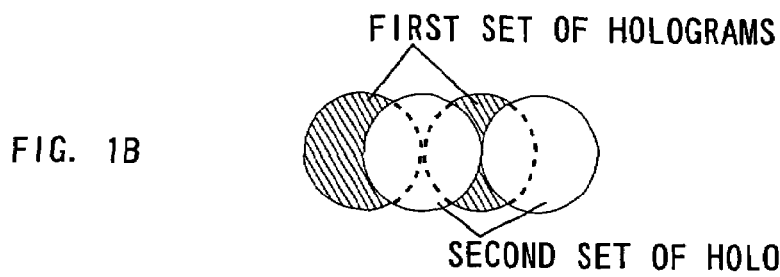
Figure 1C:
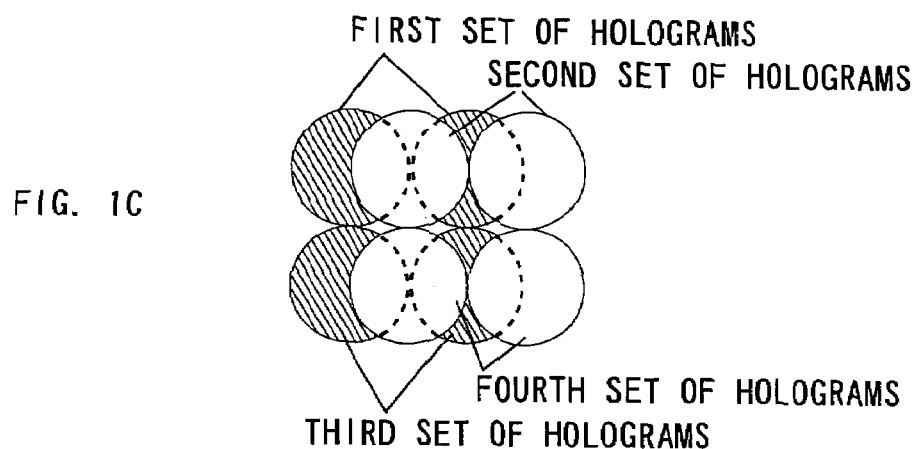
Figure 1D:
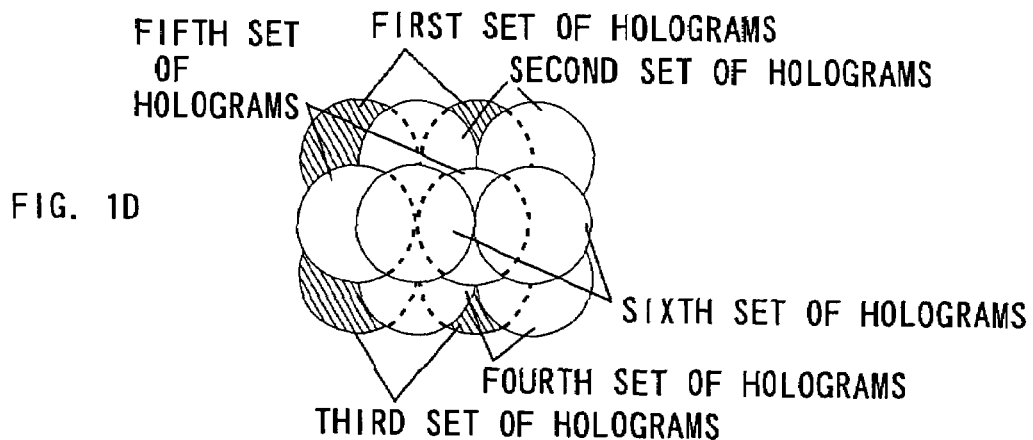
Figure 2:
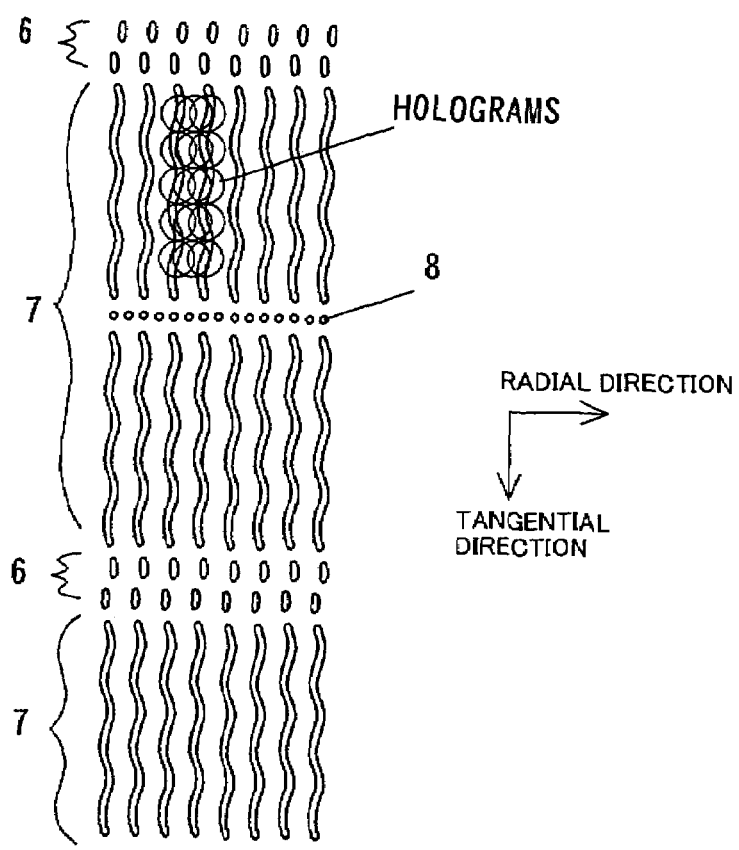
FIG. 2 is a partial pan view generally showing a track structure on a conventional hologram recording medium.

In the following, embodiments of the present invention will be described with reference to the drawings.

<Recording Medium>

FIG. 3 shows a disk-shaped hologram recording medium according to an exemplary embodiment of the present invention.

A hologram disk 2 comprises a disk-shaped substrate 3 made of an optically transparent material, and a recording layer 4 carried on a main surface of the substrate and made of a photo-sensitive material.

For enabling information to be recorded or reproduced with light which passes through the recording layer 4, a photo-refractive material, a hole burning material, a photo-chromic material, or the like is used as a photo-sensitive material, of which the recording layer 4 is made, for preserving an optical interference pattern.

A reflective layer 5 is laminated on the opposite side of the substrate 3 from the main surface on which the recording layer 4 is laminated. The substrate 3 functions as a separation layer interposed between the recording layer 4 and reflective layer 5. The transparent substrate should not prevent light from impinging thereon, so that the hologram recording medium is given a proper intensity of light. In this way, an optical hologram recording medium can be implemented in such a scheme that light impinges on the substrate 4 and reflective layer 5 from the recording layer 4. Though not particularly limited, the material of which the substrate is made may be, for example, glass, polycarbonate, amorphous polyolefin, polyimide, plastics such as PET, PEN, PES, ultraviolet curing acrylic resin, and the like. The substrate should typically have a thickness on the order of 0.1-0.2 mm. The substrate may be formed with concavo-convex pits and/or guiding grooves, or the like, corresponding to address information and the like, on both sides or one side. Their pitch may be on the order of 0.3 to 1.6 mm, with a level difference on the order of 30-200 nm.

The material for the reflective layer 5 may be Al, Au, Ag, or an alloy thereof. The reflective layer 5 may have a thickness, for example, in a range of approximately 30 to 100 nm. A film made of these materials can be formed by known methods such as a sputtering method, a vapor deposition method, and the like.

An optically transparent cover layer (not shown) can be disposed on the outer surface of the recording layer 4.

At the interface of the substrate 3 with the reflective layer 5, grooves are formed at a first pitch, and extend without intersection, as a plurality of tracks T. For conducting a tracking servo control, the tracks T are formed spirally or concentrically on the substrate with respect to the center thereof, or in a plurality of cut spiral arcs. The interface functions as a guide layer on which the tracks are formed. The tracking servo forces a recording light beam (reference light and signal light) LS to follow between adjacent tracks T on the reflective layer 5 during recording and reproduction. As shown in FIG. 3, for example, the optical axis of the recording light beam LS is defined such that the recording light beam LS is positioned at the center of light spots of four servo beams SB arranged in a linear fashion, to conduct the tracking servo control to record holograms on the recording layer 4 over a mirror face region between adjacent tracks.

The tracking servo is conducted by driving an objective lens by an actuator in accordance with a detected signal, using a pickup which includes a light source for emitting a light beam, an optical system including an objective lens for converging the light beam on the reflective layer 5 as a light spot and leading its reflected light to a photodetector, and the like. The diameter of the light spot is set to be narrowed down to a value determined by the wavelength of the light beam and the numerical aperture (NA) of the objective lens (a so-called diffraction limit which is, for example, 0.82l/NA (1=wavelength), but is determined only by the wavelength of light and the numerical aperture when aberration is sufficiently small as compared with the wavelength). In other words, the light beam radiated from the objective lens is used such that it is focused when the reflective layer lies at the position of its beam waist. The width of the grooves is determined as appropriate in accordance with the output of the photodetector which receives the reflected light from the light spot, for example, a push-pull signal.

Figure 4:
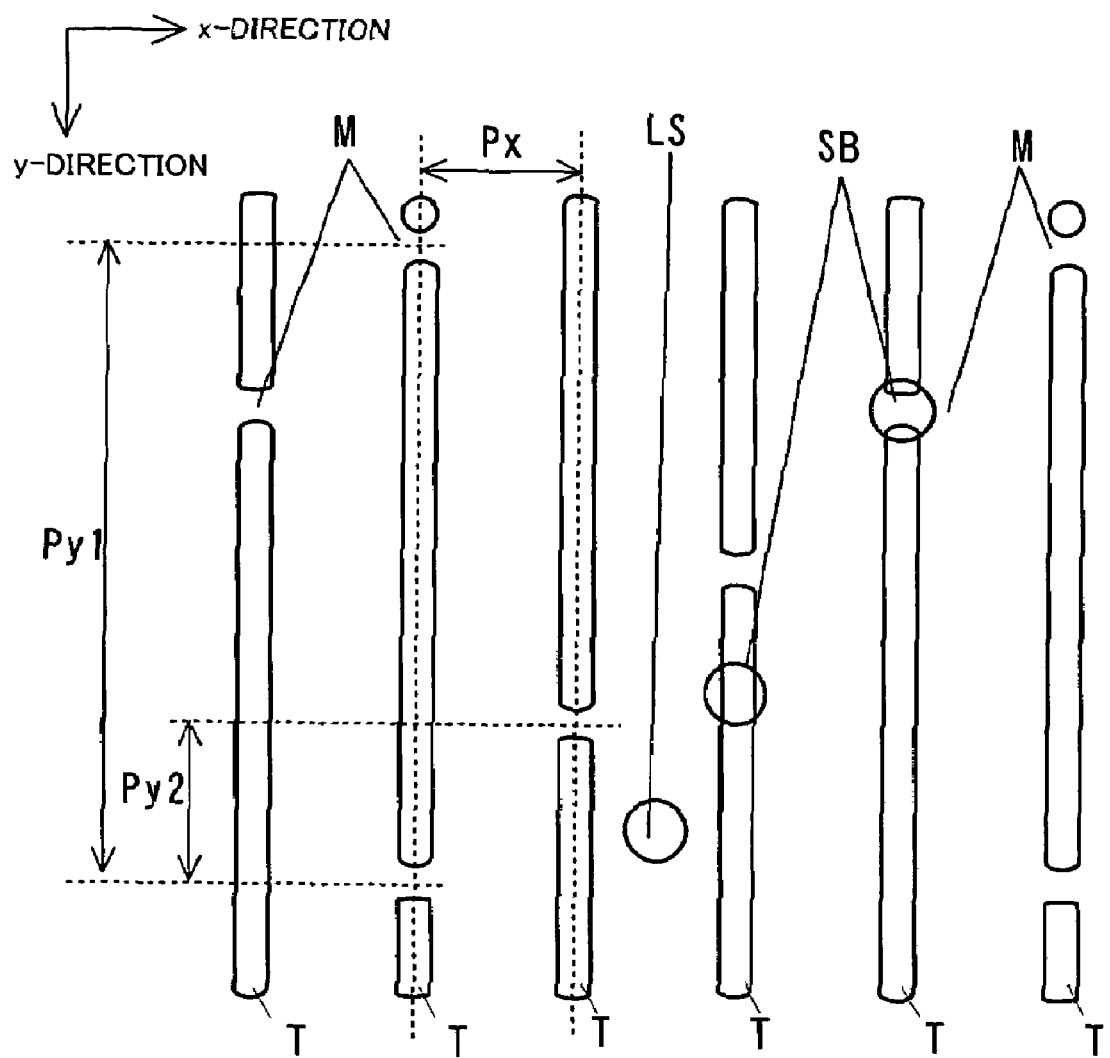
FIG. 4 is a partial plan view generally showing the track structure on the hologram disk according to the embodiment of the present invention.

As shown in FIG. 4, a first pitch, i.e., a track pitch Px (x-direction) of the tracks T on the reflective layer 5 is set as a predetermined distance which is determined by the multiplicity of holograms HG recorded above the spot of the light beam LS. The multiplicity of holograms is determined by the characteristics of the hologram recording medium, NA of the objective lens, and the like. For example, an article of D. Psaltis, M. Levene, A. Pu, G. Barbastathis and K. Curtis, "Holographic storage using shift multiplexing" OPTICS LETTERS Vol. 20, No. 7 (Apr. 1, 1995), pp. 782-784 shows that a logical minimum distance by which adjacent holograms can be independently separated when a spherical reference wave is used, i.e., a minimum traveling distance in the shift multiplex recording scheme, is determined by the wavelength of signal light, the distance between an objective lens and a hologram recording medium, the thickness of the hologram recording medium, an angle at which the signal light intersects with the spherical reference wave, and the numerical aperture of the objective lens. With an actual hologram recording medium, when a subsequently recorded hologram is superimposed on a previously recorded hologram substantially at the same position, part of the previously recorded hologram is erased by the subsequently recorded hologram. A maximum multiplicity in an actual shift multiplex recording hologram system (i.e., a value (number of times) indicating how many independent holograms can be recorded within the same volume in a hologram recording medium) is determined by the medium and the configuration of the apparatus, as mentioned above. A minimum track pitch Px (i.e., a minimum shift distance) is set by a span of a recorded hologram area divided by the maximum multiplicity. The track pitch Px is set at the minimum shift distance or more. The track pitch Px is set at the minimum shift distance or more. In other words, the track pitch Px is set at a value determined by the center-to-center distance of a pair of holograms, which are in closest proximity, of a plurality of holograms to be formed on the recording layer. Here, "a pair of holograms in close proximity" refers to a pair of holograms, the spatially existing ranges of which are adjacent to each other, so that the peripheries thereof are in close proximity, in contact, or partially overlapping.

For precisely positioning the recording light beam LS in this embodiment, a y-direction positioning mark M is formed on the reflective layer 5. The y-direction positioning mark M is disposed such that the respective marks are spaced apart by a mark pitch Py1 (second pitch) in a direction in which the tracks T extend (y-direction), and the mark pitch Py1 is a function of the track pitch Px.

For example, the mark pitch Py1 of the y-direction positioning marks M on the same track is assumed to have a size larger than the track pitch Px substantially by a factor of an integer. On the other hand, an adjoining pitch Py2 between the y-direction positioning marks M on adjacent tracks in the y-direction is assumed to have substantially the same length as the track pitch Px. With this track structure on the hologram disk, a light spot can be precisely moved between adjacent tracks to be recorded. A normal optical disk requires only positioning (tracking servo) in a direction (x-direction) perpendicular to a direction (y-direction) in which tracks extend, so that a position cannot be precisely determined in the x- and y-directions. On the contrary, in this embodiment, precise multiplex recording can be achieved a plurality of times by providing the y-direction positioning marks M in the track structure for use in the positioning in the y-direction.

<Recording Method>

For recording holograms in the present invention, the hologram recording medium is divided into layers which can be temporally overlapped, and a recording sequence is performed for each of these layers. The recording sequence is a process of recording holograms and forming their groups. On each layer, holograms are recorded at a density lower than the recording density of the maximum multiplicity. Further, the recording is performed sequentially from a site of the recording layer which has been least frequently irradiated with light.

Figure 5:
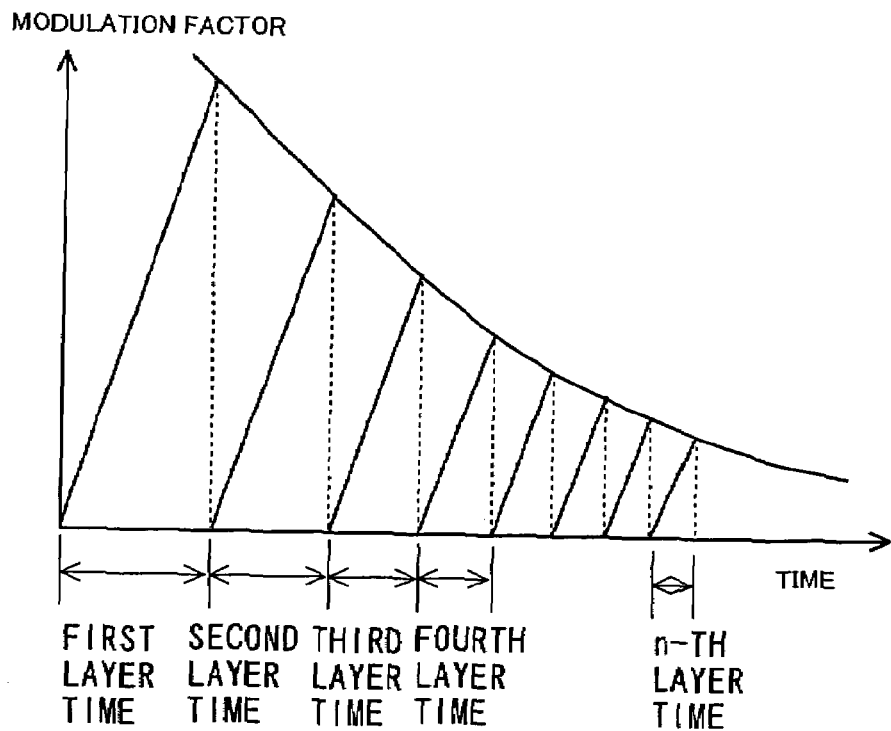
FIG. 5 is a graph showing the relationship between a multiplex recording time and a modulation factor of holograms in one embodiment of the present invention.

For example, description will be made on a scenario in which a particular area shown in FIG. 4 is recorded through 16 recording sequences (16 layers) up to the recording density of the maximum multiplicity. The particular area may be the overall recording layer, or a block such as a partially determined recording area, a sector, an address region, or the like. In this event, the power of a recording laser, or a recording time is assumed to be at a predetermined constant value. The recording time can be determined from the relationship between the multiplex recording time of holograms and modulation factor, as shown in FIG. 5. A hologram recording time on each layer is determined in consideration of the performance of the medium.

Figure 6:
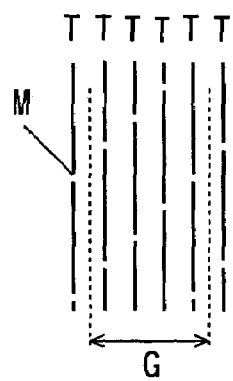
FIGS. 6 to 10 are plan view showing tracks on a hologram recording medium according to one embodiment of the present invention and a recording procedure.

Columns of holograms are recorded in a recording sequence on each layer at a hologram recording pitch (equal to four tracks T) G larger than the track pitch shown in FIG. 6. Individual holograms may be recorded for a constant recording time until the recording on each layer is completed.

Figure 7:
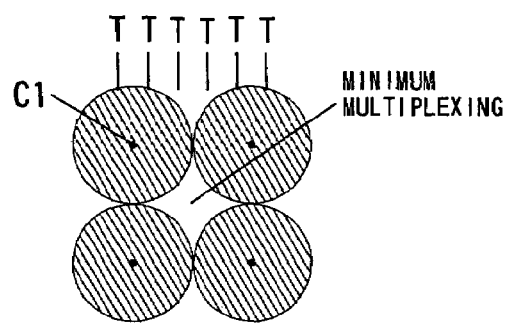

First, as shown in FIG. 7, in the recording sequence for a first layer, holograms (center C1) are sequentially recorded such that an overlapping portion is minimized on the hologram recording pitch G, and the recording is repeated until the layer is filled with holograms. Consequently, a minimum multiplexing portion remains among the holograms (center C1).

Figure 8:
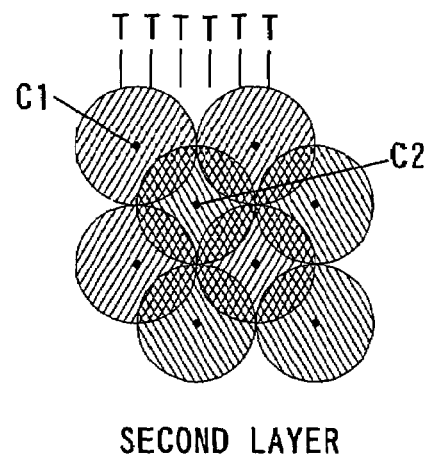

Next, in the recording sequence for a second layer, columns of holograms (center C2) are sequentially recorded at the hologram recording pitch in a similar manner to the first layer, as shown in FIG. 8, and the recording is repeated until the layer is filled with holograms. When the recording of the second layer is performed on a portion in which the recording of the first layer has been performed, the recording is performed such that the multiplexing portion of the first layer is substantially the same as that of the second layer just in the middle (minimum multiplexing portion) of the hologram recording on the first layer. A hologram recording time for the second layer can be determined with reference to the graph of FIG. 5 from a reduction in the modulation factor of the hologram recording on the first layer, and the modulation factor of holograms on the second layer. This method of determining the recording time involves scheduling the recording to make constant the diffraction efficiency of each layer, as is the case with the general multiplex recording scheme of holograms, but only needs to set a recording time on a layer-by-layer basis, thus facilitating the control.

Figure 9:
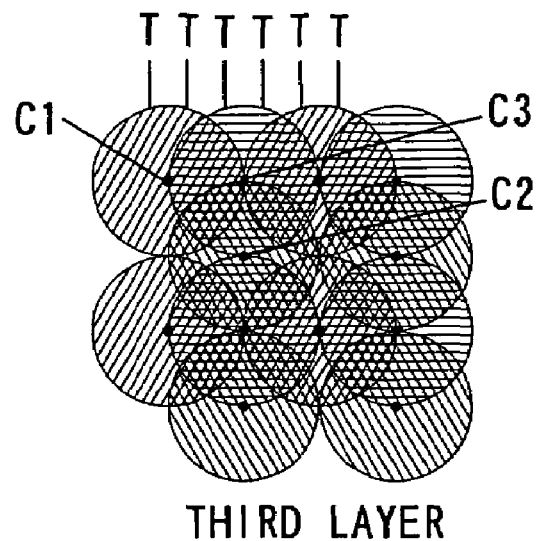

Next, in the recording sequence for a third layer, columns of holograms (center C3) are also sequentially recorded at the hologram recording pitch, in a manner similar to the first and second layers, and the recording is repeated until the layer is filled with holograms, as shown in FIG. 9. Again, the recording is started sequentially from a site which is least frequently irradiated with light.

Figure 10:
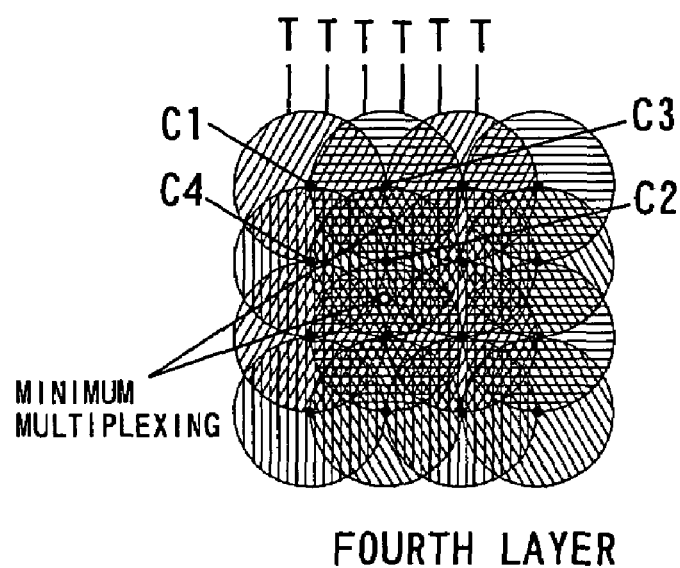

Next, in the recording sequence for a fourth layer, columns of holograms (center C4) are also sequentially recorded at the hologram recording pitch, in a manner similar to the first, second, and third layers, and the recording is repeated until the layer is filled with holograms, as shown in FIG. 10. Again, the recording is started sequentially from a site which is least frequently irradiated with light.

The recording is performed similarly for a fourth layer onward, until the maximum multiplicity is reached.

In this embodiment, the ratio Py1/Py2 of the mark pitch Py1 to the adjoining pitch Py2 indicates the number of multiplexing in the y-direction, i.e., the total number of layers. Since the same is applied to the x-direction as well (Px~Py2), the number of times of recording which realizes the maximum multiplicity is calculated as $(Py1/Px)^2$=Total Number of Layers.

Figure 11:
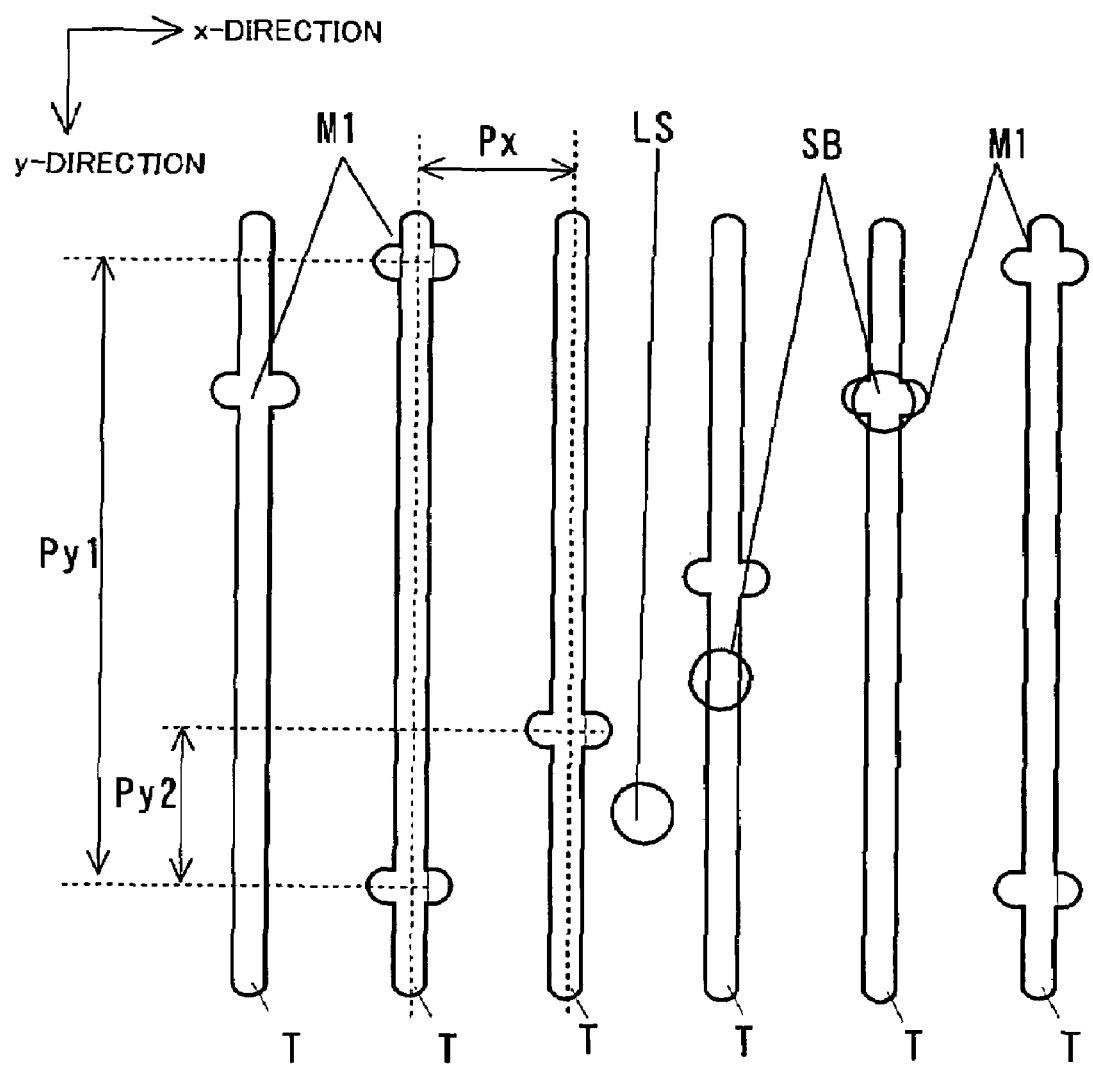
FIGS. 11 to 15 are partial plan views generally showing a track structure on a hologram disk according to another embodiment of the present invention.
Figure 12:
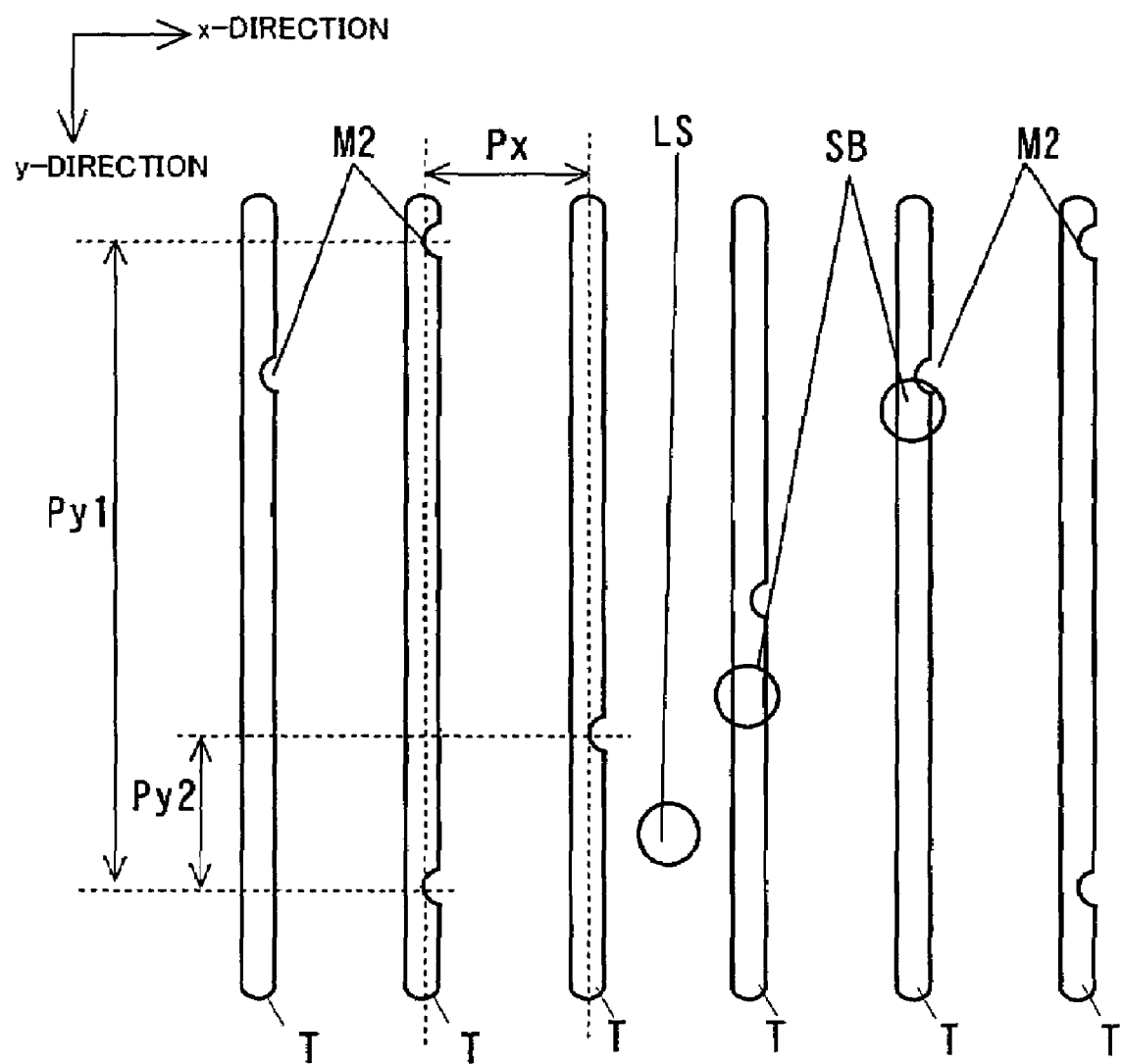
Figure 13:
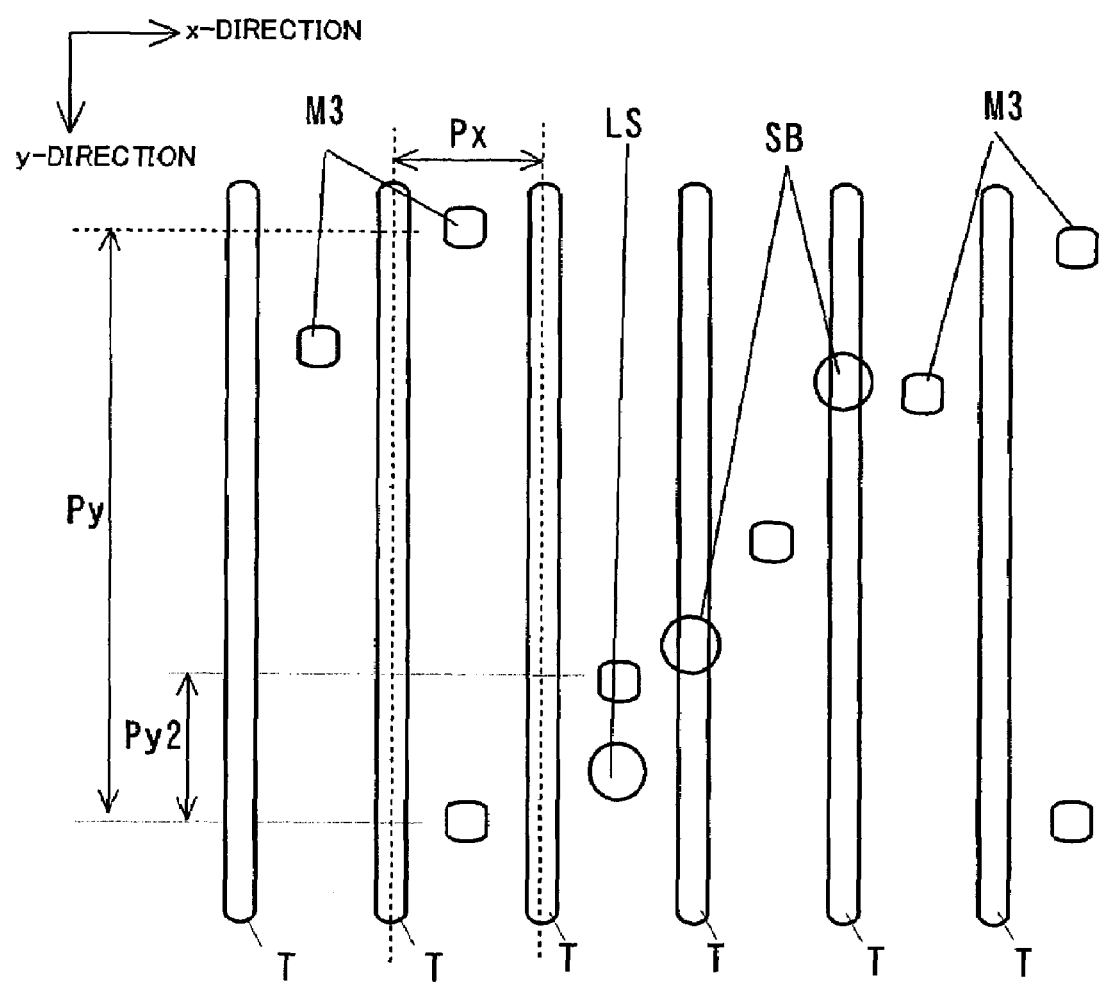

While several shapes can be contemplated for the y-direction positioning mark M, any shape may be employed as long as it can be sensed by the servo beam. For example, the y-direction positioning mark M may be a mirror face portion free of the track, as shown in FIGS. 3 and 4, and otherwise, the y-direction positioning mark M may be an enlarged width portion of a track Ml, as shown in FIG. 11; a notch M2 which is cut into part of the side surface of a track, as shown in FIG. 12; or a pit M3 disposed between adjacent tracks, as shown in FIG. 13.

The y-direction positioning mark M may be in the shape of a concavo-convex pit, or a mark of a contrast pattern. Since information of the y-direction positioning mark M can be read by a spot of the servo beam SB, it is possible to identify the mark pitch and track pitch in the track extending direction and the direction perpendicular thereto, and to simultaneously acquire a synchronization signal.

The entire tracks may have a structure of a spiral wound several times or a concentric circle structure.

Figure 14:
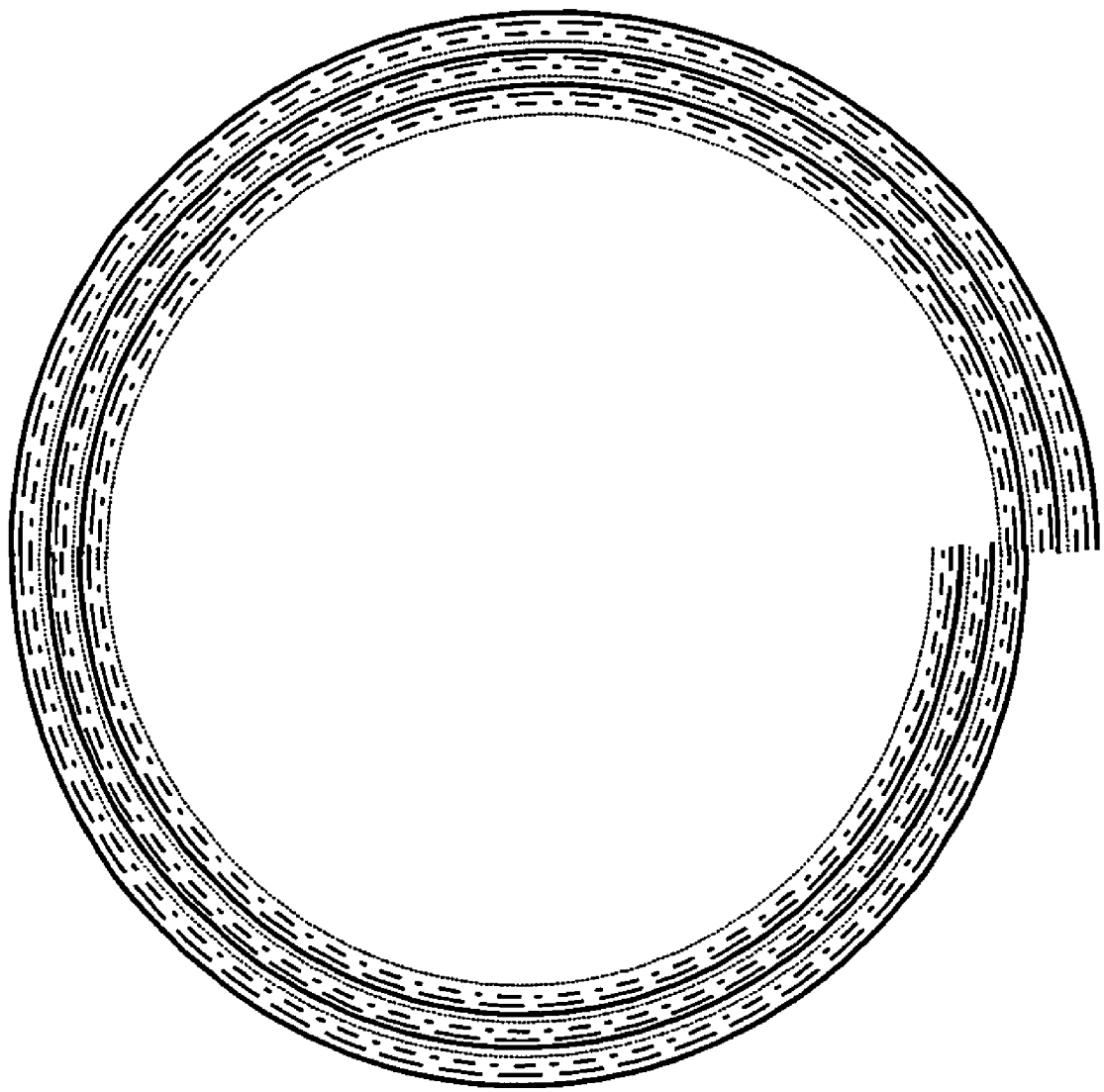

When the medium has the structure of a spiral wound several times as shown in FIG. 14, a hologram recording pitch in the y-direction is determined by the y-direction positioning mark M. The hologram recording in the x-direction can be realized by continuously following the tracks if they are in spiral structure. The number of spirals is defined by Py1/Py2. For example, when a hologram recording pitch on the first layer is four times as much as the track pitch Px, the resulting spirally structured tracks comprises a set of four tracks (indicated by different types of lines).

Figure 15:
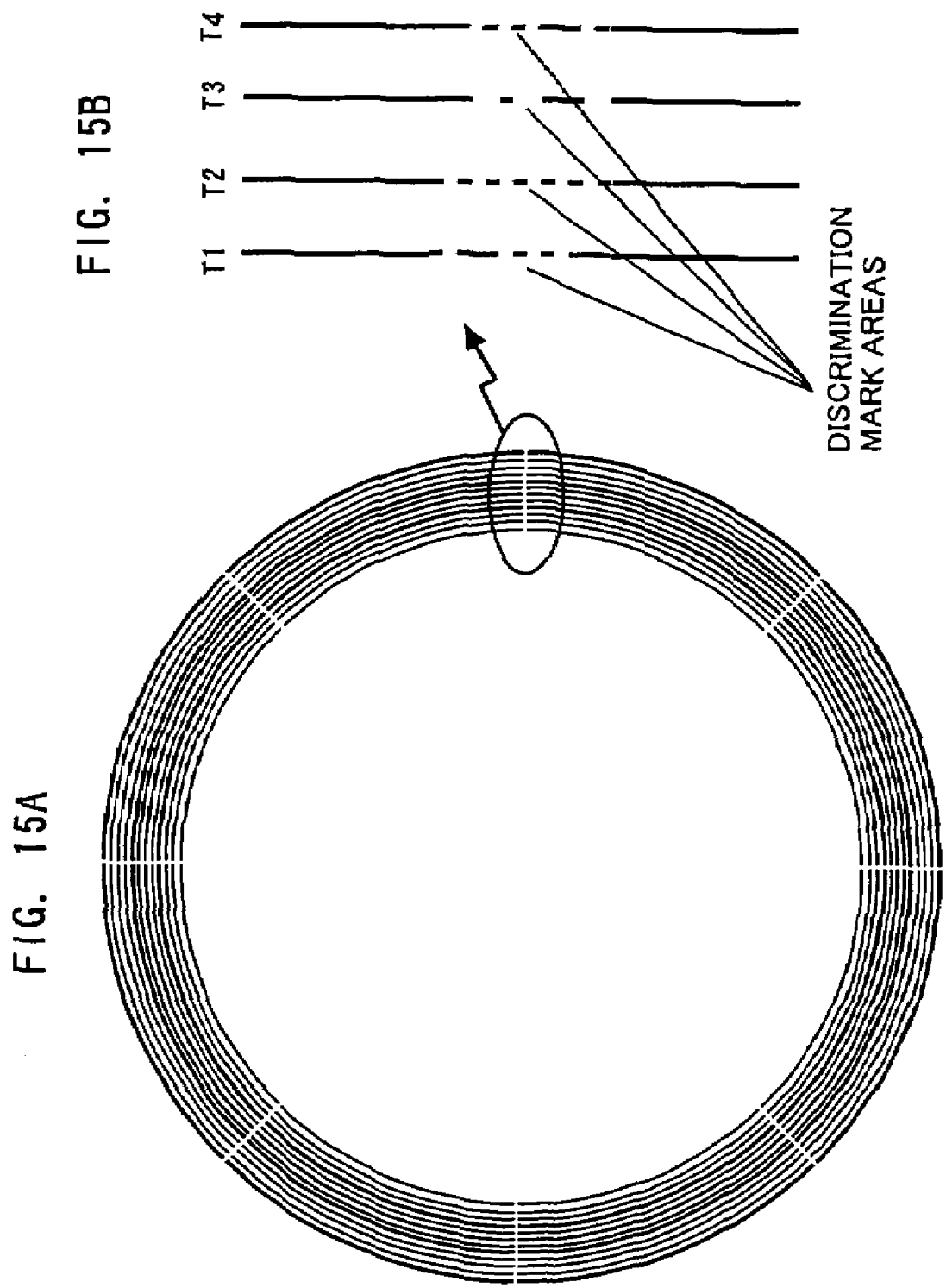
Figure 16:
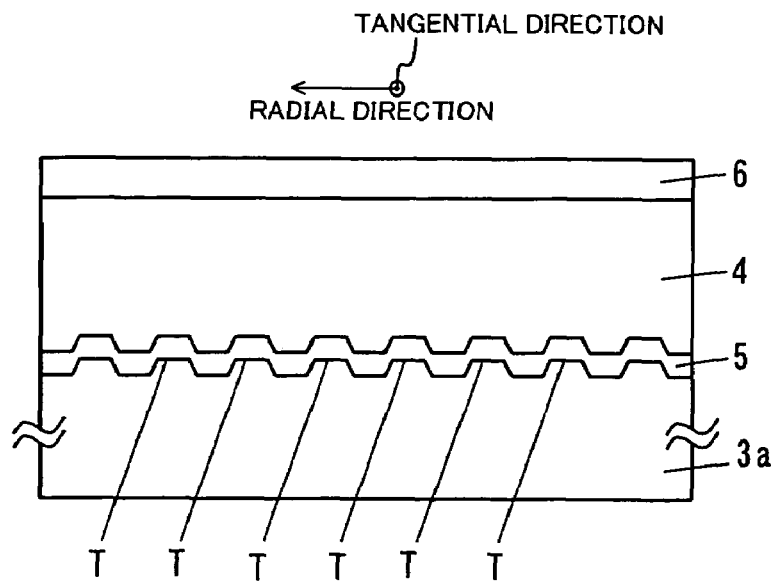
FIG. 16 is a partial cross-sectional view generally showing a hologram disk according to another embodiment of the present invention.

When the medium has tracks in concentric circle structure as shown in FIG. 15A, a hologram recording pitch in the x-direction can be determined by discriminating respective tracks, and switching the tracks depending on the number of times of hologram recording. For example, when the hologram recording pitch on the first layer is four times as much as the track pitch Px, discrimination mark regions are provided on four tracks T1-T4, respectively, at predetermined angular positions, as shown in FIG. 15B.

While the foregoing embodiment has shown a hologram recording medium, the structure of which has a guide layer (reflective layer 5) and the recording layer 4 laminated with intervention of a separation layer (substrate 3), a hologram recording medium in another embodiment may have a reflective layer 5, a recording layer 4, and an optically transparent cover layer 6 sequentially laminated on a substrate 3a formed with tracks T, a y-direction positioning mark M, and the like, without including a separation layer. Also, an exemplary modification to this embodiment may be a hologram recording medium which has a separation layer interposed between the reflective layer 5 and recording layer 4.

<Hologram Recording/Reproducing Apparatus>

Figure 17:
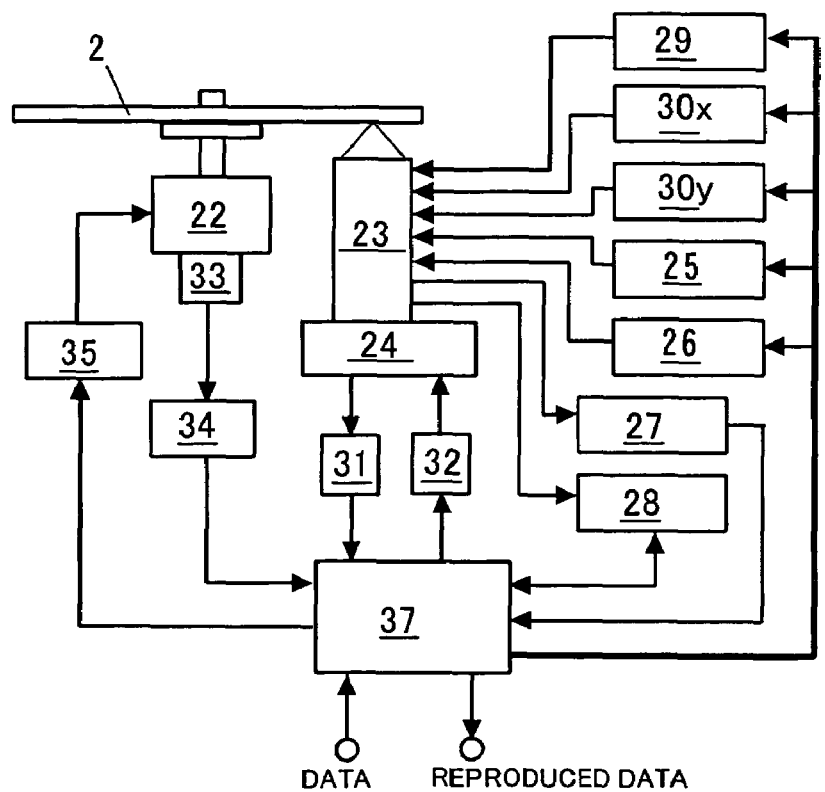
FIG. 17 is a block diagram generally showing the configuration of a recording/reproducing apparatus for recording or reproducing information to or from a hologram disk according to one embodiment of the present invention.

FIG. 17 generally shows an exemplary configuration of a recording/reproducing apparatus for recording or reproducing information to or from a hologram recording medium to which the present invention is applied.

The hologram recording/reproducing apparatus of FIG. 17 comprises a spindle motor 22 for rotating a disk 2, which is a hologram recording medium, through a turn table; a pickup device 23 for reading a signal from the hologram disk 2 with a light beam; a pickup actuator 24 for holding and moving the pickup in a radial direction (x-direction); a first laser source driving circuit 25; a spatial light modulator driving circuit 26; a reproduced signal processing circuit 27; a servo signal processing circuit 28; a focus servo circuit 29; an x-direction movement servo circuit 30x; a y-direction movement servo circuit 30y; a pickup position detecting circuit 31 connected to the pickup actuator 24 for detecting a pickup position signal; a slider servo circuit 32 connected to the pickup actuator 24 for supplying a predetermined signal to the pickup actuator 24; a rotation encoder 33 connected to the spindle motor 22 for detecting a rotational speed signal of the spindle motor; a rotation detector 34 connected to the rotation encoder 33 for generating a rotating position signal of the hologram disk 2; and a spindle servo circuit 35 connected to the spindle motor 22 for supplying a predetermined signal to the spindle motor 22.

The hologram recording/reproducing apparatus comprises a controller circuit 37 which is connected to the first laser source driving circuit 25, spatial light modulator driving circuit 26, reproduced signal processing circuit 27, servo signal processing circuit 28, focus servo circuit 29, x-direction movement servo circuit 30x, y-direction movement servo circuit 30y, pickup position detecting circuit 31, slider servo circuit 32, rotation encoder 33, a rotation detector 34, and spindle servo circuit 35. The controller circuit 37 conducts a focus servo control, an x- and y-direction movement servo control, are produced position (position in the x- and y-direction) control, and the like related to the pickup through the foregoing circuits connected thereto based on signals from these circuits. The controller circuit 37, which is based on a microcomputer that is equipped with a variety of memories for controlling the overall apparatus, generates a variety of control signals in accordance with manipulation inputs from the user from an operation unit (not shown) and a current operating condition of the apparatus, and is connected to a display unit (not shown) for displaying an operating situation and the like for the user. The controller circuit 37 is also responsible for processing such as encoding of data to be recorded, input from the outside, and the like, and supplies a predetermined signal to the spatial light modulator driving circuit 26 for controlling the recording sequence. Furthermore, the controller circuit 37 performs demodulation and error correction processing based on signals from the reproduced signal processing circuit 27 to restore data recorded on the hologram disk. In addition, the controller circuit 37 decodes restored data to reproduce information data which is output as reproduced information data.

Figure 18:
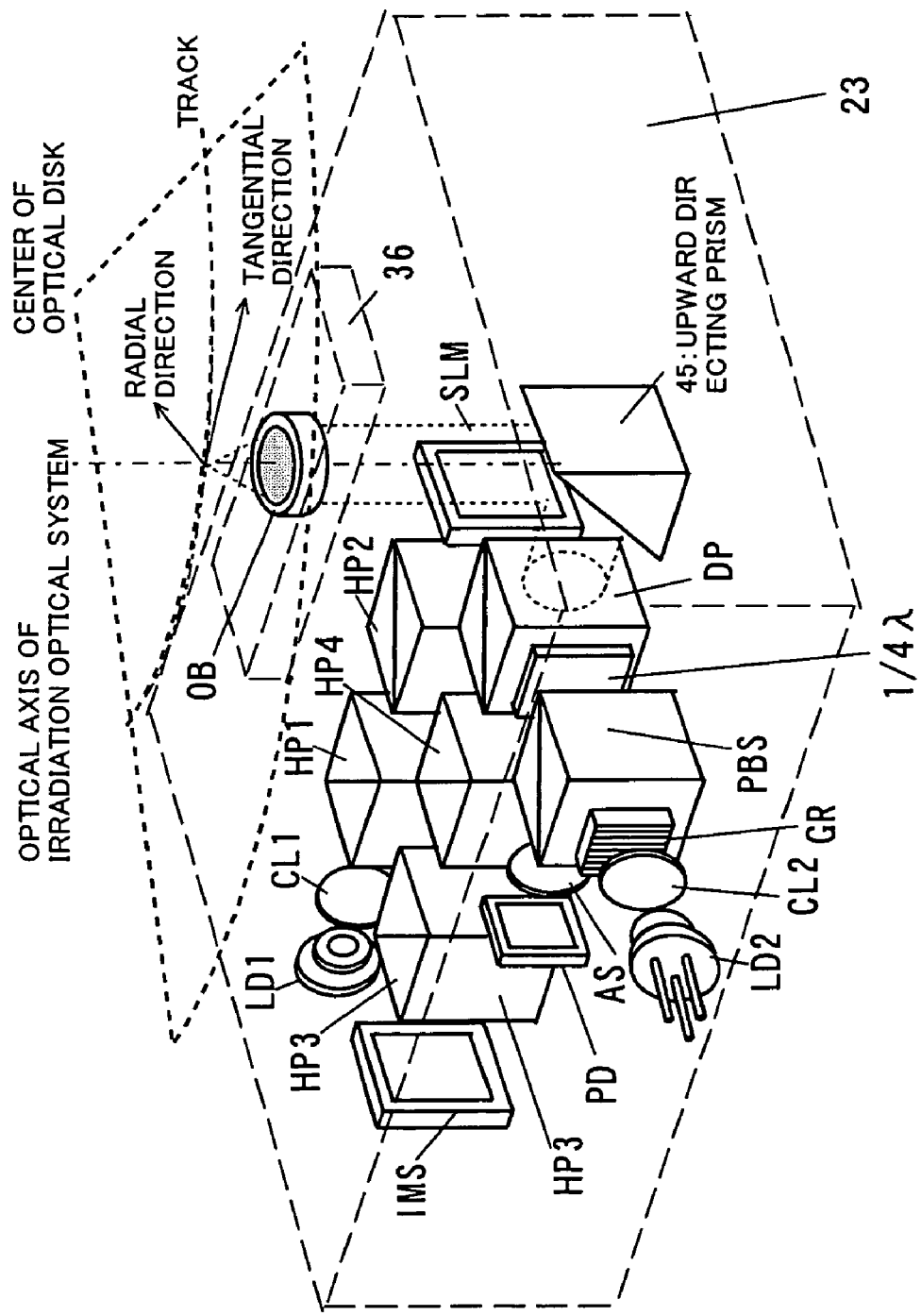
FIG. 18 is a perspective view generally showing a pickup of the recording/reproducing apparatus for recording/reproducing information to/from a hologram disk according to one embodiment of the present invention.
Figure 19:
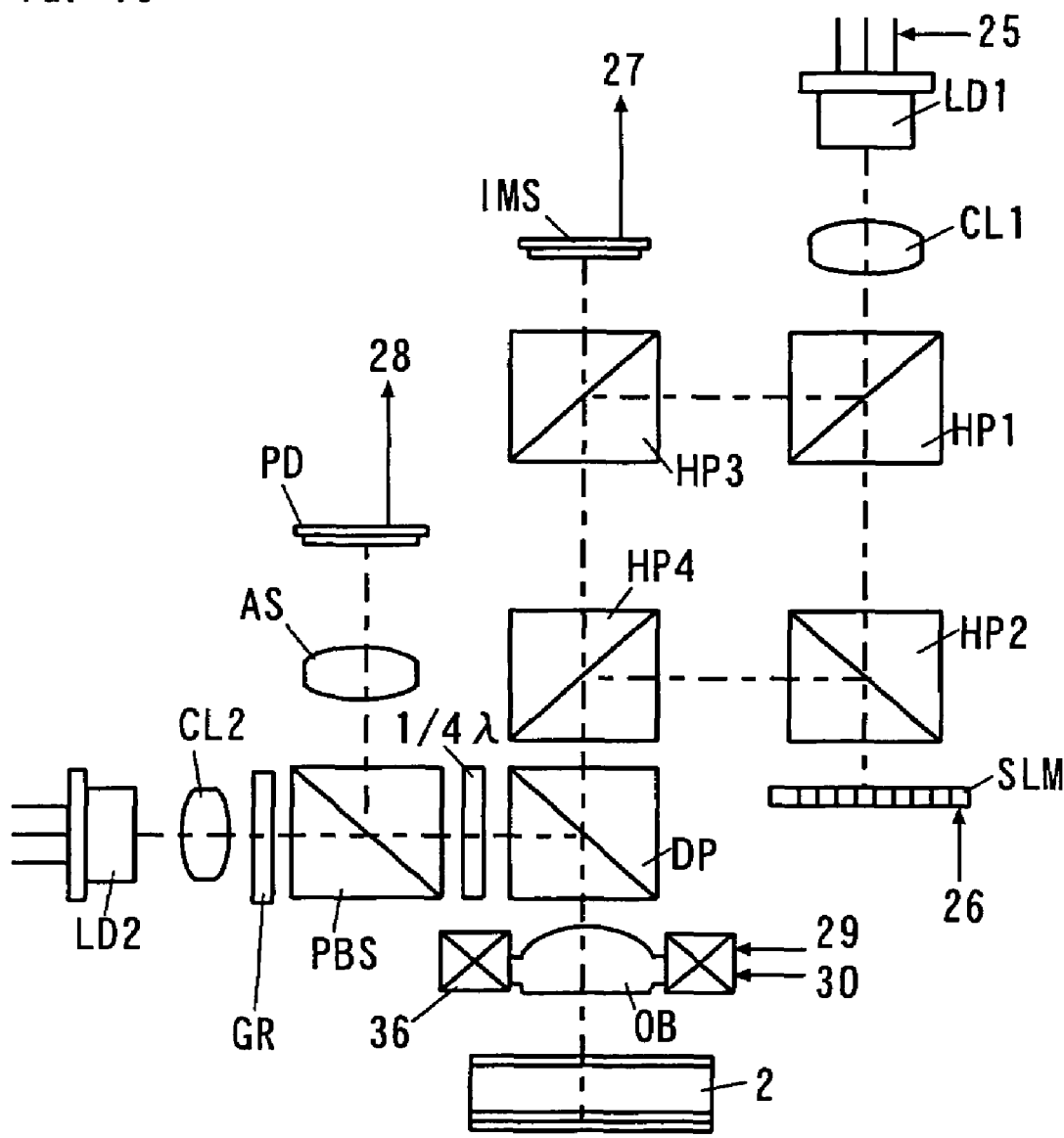
FIG. 19 is a schematic diagram generally showing a configuration of the pickup of the recording and reproducing apparatus for recording and reproducing information to/from a hologram disk according to one embodiment of the present invention.

FIGS. 18 and 19 generally show the configuration of the pickup of the recording/reproducing apparatus. The pickup device 23 comprises a recording/reproducing optical system which is made up of a first laser source LD1 for recording and reproducing holograms, a first collimator lens CL1, a first half mirror prism HP1, a second half mirror prism HP2, a spatial light modulator SLM, a reproduced signal detector including an image sensor IMS comprised of an array such as a CCD, a complimentary metal oxide semiconductor device, or the like, a third half mirror prism HP3, and a fourth half mirror prism HP4; a servo system which is made up of an objective lens actuator 36 for servo-controlling (movements in the x-, y-, z-directions) of the position of a light beam with respect to the hologram disk 2, a second laser source LD2, a second collimator lens CL2, a diffraction optical element GR such as a grating or the like for generating a multi-beam for a servo light beam, a polarization beam splitter PBS, a quarter wavelength plate ¼λ, a coupling lens LS, and a servo signal detector including a photodetector PD; and a common system which is made up of a dichroic prism DP and an objective lens OB. These systems are placed substantially on the common plane except for the objective lens OB.

As shown in FIGS. 18 and 19, half mirror surfaces of the first, third and fourth half mirror prisms HP1, HP3, and HP4 are disposed to be parallel with one another. In a normal direction of these half mirror planes, the half mirror plane and the separation planes of the second half mirror prism HP2 and the dichroic prism DP and polarization beam splitter PBS are in parallel with one another. These optical parts are disposed such that the optical axes (one-dot chain lines) of light beams from the first and second laser sources LD1 and LD2 extend to the recording and reproducing optical system and servo system, respectively, and substantially match in the common system.

The first laser source LD1 is connected to the first laser source driving circuit 25, and has its output adjusted by the first laser source driving circuit 25 such that the intensity of an emitted light beam is increased for recording and decreased for reproduction.

The spatial light modulator SLM has a function of electrically transmitting or blocking part or all of incident light with a liquid crystal panel or the like having a plurality of pixel electrodes divided in a matrix shape. The spatial light modulator SLM, which is connected to the first laser source driving circuit 25, modulates and reflects an light beam so as to have a polarization component distribution based on page data to be recorded (two-dimensional data of information pattern such as bright and dark dot pattern or the like on a plane) from the spatial light modulator driving circuit 26 to generate signal light.

The reproduced signal detector including the image sensor IMS is connected to the reproduced signal processing circuit 27.

Further, the pickup device 23 is provided with the objective lens actuator 36 for moving the objective lens OB in the optical axis (x) parallel direction, and in a track (y) parallel direction, and in a radial (x) direction perpendicular to the track.

The photodetector PD is connected to the servo signal processing circuit 28, and has the shape of light receiving element divided for focus and x and y direction movement servo generally used for optical discs. The servo scheme is not limited to an astigmatism method, but can employ a push-pull method. The output signal of the photodetector PD, such as a focus error signal and a tracking error signal etc. is supplied to the servo signal processing circuit 28.

In the servo signal processing circuit 28, a focusing driving signal is generated from the focus error signal, and is supplied to the focus servo circuit 29 through the controller circuit 37. The focus servo circuit 29 drives the focusing section of the objective lens actuator 36 mounted in the pickup device 23, so that the focusing section operates to adjust the focus position of an optical spot irradiated to the hologram disk.

Further, in the servo signal processing circuit 28, x and y direction movement driving signals are generated from x and y direction movement error signals, and supplied to the x and y direction movement servo circuits 30x and 30y respectively. The x and y direction movement servo circuits 30x and 30y drive the objective lens actuator 36 mounted in the pickup device 23 in response to the driving signals, so that the objective lens actuator displaces the position of the optical spot irradiated to the hologram disk by amounts corresponding to the driving currents carried by the driving signals.

The controller circuit 37 generates a slider driving signal based on a position signal from the operation panel or the pickup position detecting circuit 31 and the x direction movement (tracking) error signal from the servo signal processing circuit 28, and supplies the slider driving signal to the slider servo circuit 32. The slider servo circuit 32 moves the pickup device 23 in the radial direction of the disk in response to a driving current carried with the slider driving signal by the pickup actuator 24.

The rotation encoder 33 detects a frequency signal indicative of a current rotating frequency of the spindle motor 22 for rotating the hologram disk 2 through the turn table, generates a rotational speed signal indicative of the spindle rotational signal corresponding thereto, and supplies the rotational speed signal to the rotation detector 34. The rotation detector 34 generates a rotational speed position signal which is supplied to the controller circuit 37. The controller circuit 37 generates a spindle driving signal which is supplied to the spindle servo circuit 35 to control the spindle motor 22 for driving the hologram disk 2 to rotate.

Figure 20:
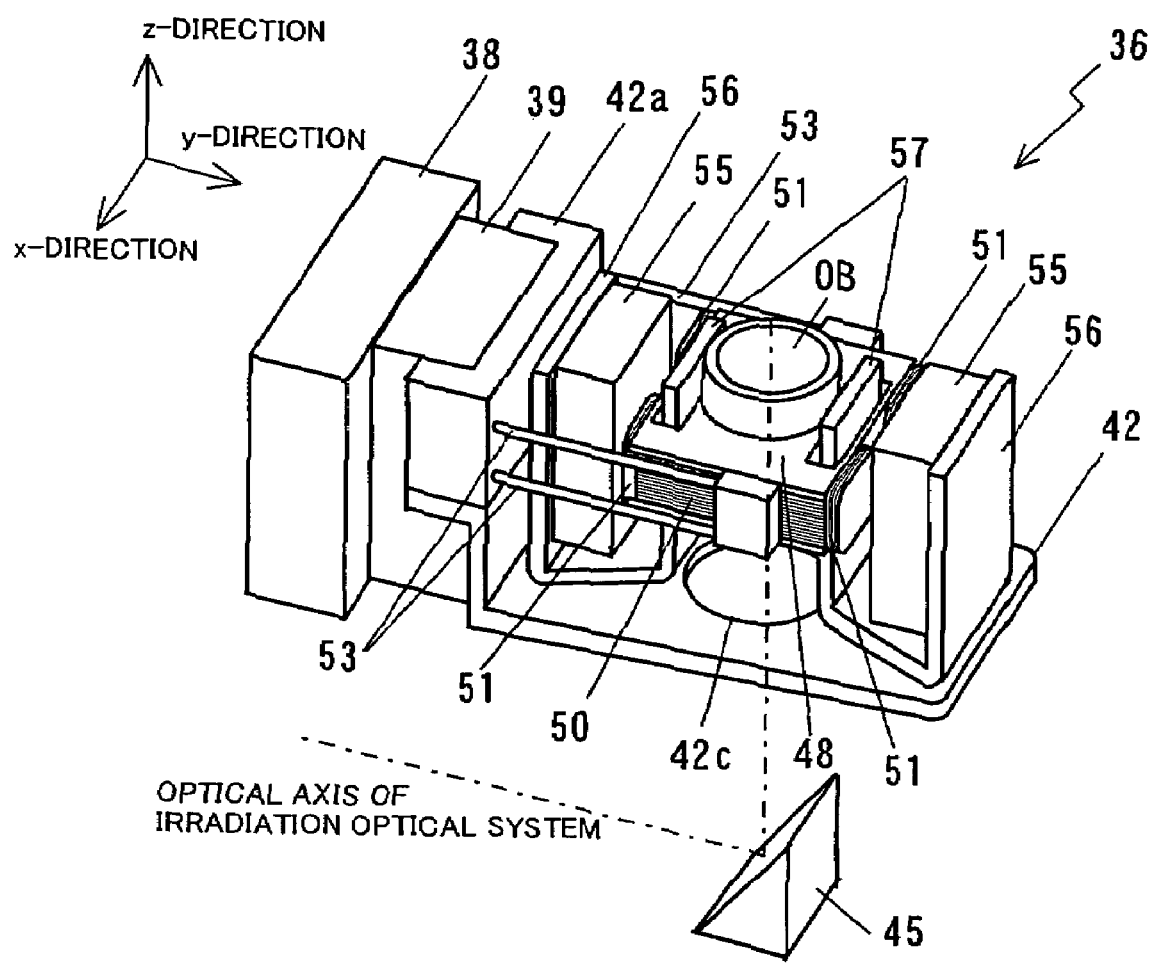
FIG. 20 is a perspective view generally showing a triaxial actuator for an objective lens in the pickup of the recording/reproducing apparatus for recording/reproducing information to/from a hologram disk according to one embodiment of the present invention.

FIG. 20 shows the objective lens actuator 36 of the pickup for the hologram recording/reproducing apparatus of this embodiment. In this embodiment, the recording light beam must be precisely positioned in the x- and y-directions of the hologram recording medium. Objective lens actuators used for conventional optical pickups typically have a degree of freedom only in two axial directions, and therefore is not used in this embodiment. Thus, a triaxial actuator having a degree of freedom in three axial directions is used for positioning the objective lens in the x- and y-directions.

The objective lens actuator 36 comprises an actuator base 42 which can swing in the y-direction by a piezo element 39 which is coupled to a support 38 secured to a pickup body (not shown). Within the pickup body, there are the aforementioned optical parts required for making up the pickup such as the prism 45 for reflecting a light beam from the laser at right angles for leading the light beam to the objective lens OB, and the like. The light beam passes through an opening 42c and the objective lens OB, and is converged to spot light which is irradiated to an information recording surface of the medium on the turn table.

As shown in FIG. 20, the objective lens OB is mounted on a protrusion at an upper end of a lens holder 48 which is formed in a cylindrical shape, and makes up a movable optical system together with the objective lens. A focusing coil 50 is wound around the outer periphery of the lens holder 48 such that the central axis of the coil is in parallel with the optical axis of the objective lens OB. Four tracking coils 51, for example, are disposed outside of the focusing coil 50 such that the central axes of the coils are perpendicular to the optical axis of the objective lens OB. Each tracking coil 51 is previously wound in a ring shape, and adhered on the focusing coil 50. The movable optical system made up of the objective lens OB and lens holder 48 is supported at one end of two pairs, i.e., a total of four longitudinal supporting members 53 which are spaced apart from each other in the optical axis direction of the objective lens OB and extend in the y-direction perpendicular to the optical axis direction. However, FIG. 20 shows only three of the supporting member 53. Each supporting member 53 is cantilevered at a distal end of an extension 42a secured to the actuator base 42. Each supporting member 53 is made of a coil material or the like, and therefore has a resiliency. The movable optical system made up of the objective lens OB and lens holder 48 is movable in the x-, y-, and z-directions by the four longitudinal supporting members 53 and aforementioned piezo element 39.

The lens holder 48 is spaced apart from and sandwiched between a pair of magnetic circuits. Each magnetic circuit comprises a magnet 55 facing the lens holder 48, and a metal plate 56 for supporting the magnet 55, and is secured on the actuator base 42. The lens holder 48 is formed with a pair of throughholes which are positioned to sandwich the objective lens OB in parallel with the optical axis of the objective lens OB and the central axis of the coil inside the focusing coil 50 of the lens holder 48 in a direction in which the longitudinal supporting members 53 extend. A yoke 57, which extends from the metal plate 56 of the magnetic circuit, is inserted into each throughhole without a contact therebetween. The focusing coil 50 and tracking coil 51 are positioned within a magnetic gap of the magnetic circuit which is made up of the magnet 55 and yoke 57.

The focusing coil 50, tracking coil 51, and piezo element 39 are controlled by the focus servo circuit 29, x-direction movement servo circuit 30x, and y-direction movement servo circuit 30y, respectively. Since parallel magnetic flux crossing perpendicularly to the respective coils can be generated in the magnetic gap, driving forces in the x- and z-directions can be generated by supplying predetermined currents to the respective coils to drive the aforementioned movable optical system in the respective directions.

In this way, voice coil motors are used to drive the objective lens OB in the x- and y-directions, and the objective lens OB is driven for the y-direction together with the actuator base using a piezo element or the like. Other than the foregoing structure, the actuator may use voice coil motors for all the axes.

<Method of Recording and Reproducing Hologram>

Description will be made on a recording and reproducing method for recording or reproducing information by irradiating a hologram disk with an light beam using the hologram recording and reproducing apparatus described above.

Figure 21:
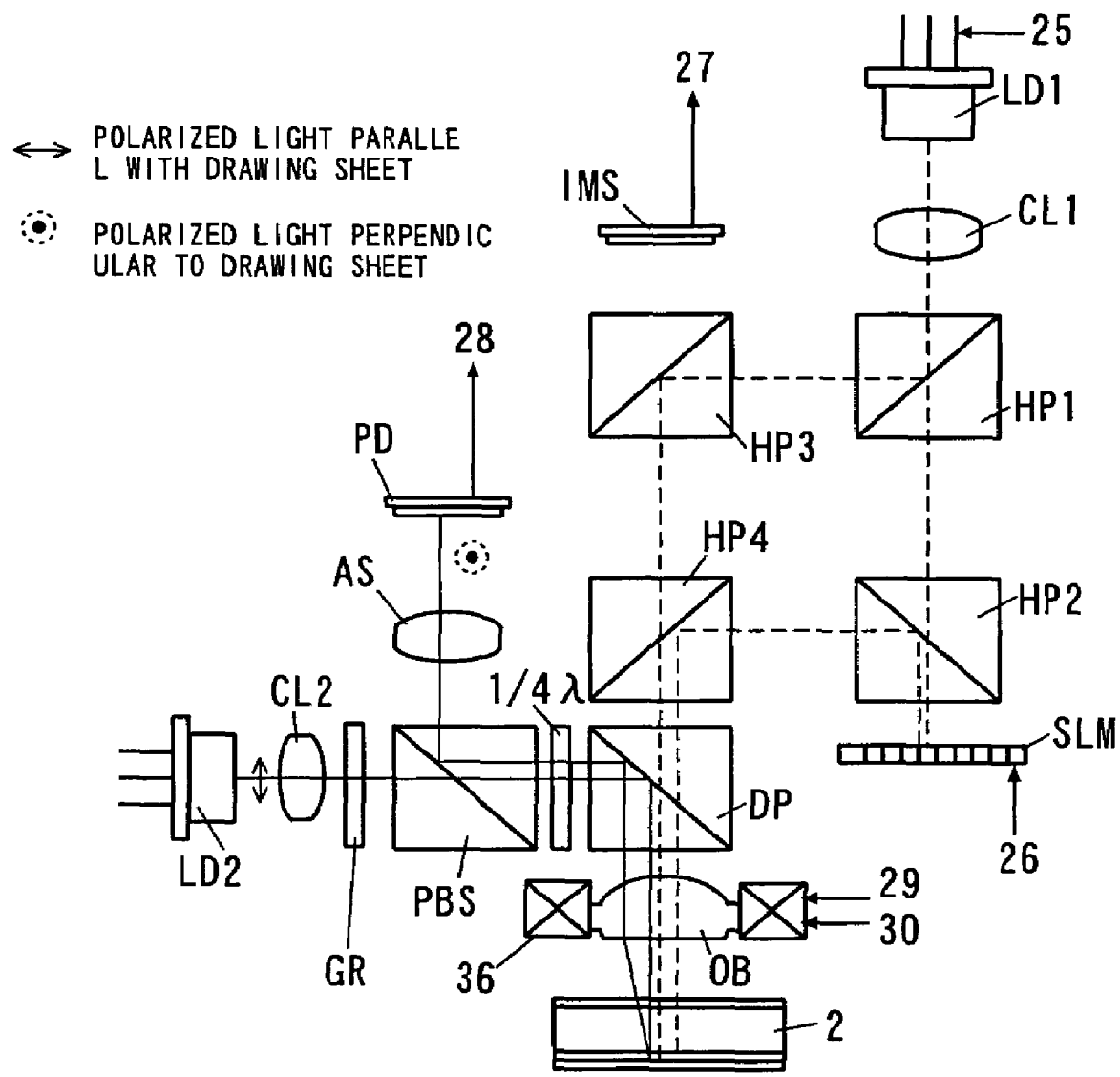
FIGS. 21 and 22 are schematic diagrams each generally showing a configuration of the pickup of the recording and reproducing apparatus for recording and reproducing information to/from a hologram disk according to one embodiment of the present invention.

During recording, as shown in FIG. 21, coherent light having a predetermined intensity from the first laser source LD1 is separated into a reference beam and a signal beam by the first half mirror HP1 (both the beams are indicated by broken lines and are shifted from the optical axis of FIG. 19 for explaining the optical path).

The signal beam transmits the second half mirror prism HP2, and impinges on the spatial light modulator SLM along the normal of the reflective surface. The signal light modulated in a predetermined manner by and reflected from the spatial light modulator SLM again impinges on the second half mirror prism HP2 and directs to the fourth half mirror prism HP4.

The reference beam is reflected by the third half mirror prism HP3, and directs to the fourth half mirror prism HP4.

The reference light and the signal light are combined using the fourth half mirror prism HP4. The two combined light beams pass through the dichroic prism DP, and are converged on the hologram disk 2 by the objective lens OB for recording a hologram.

Figure 22:
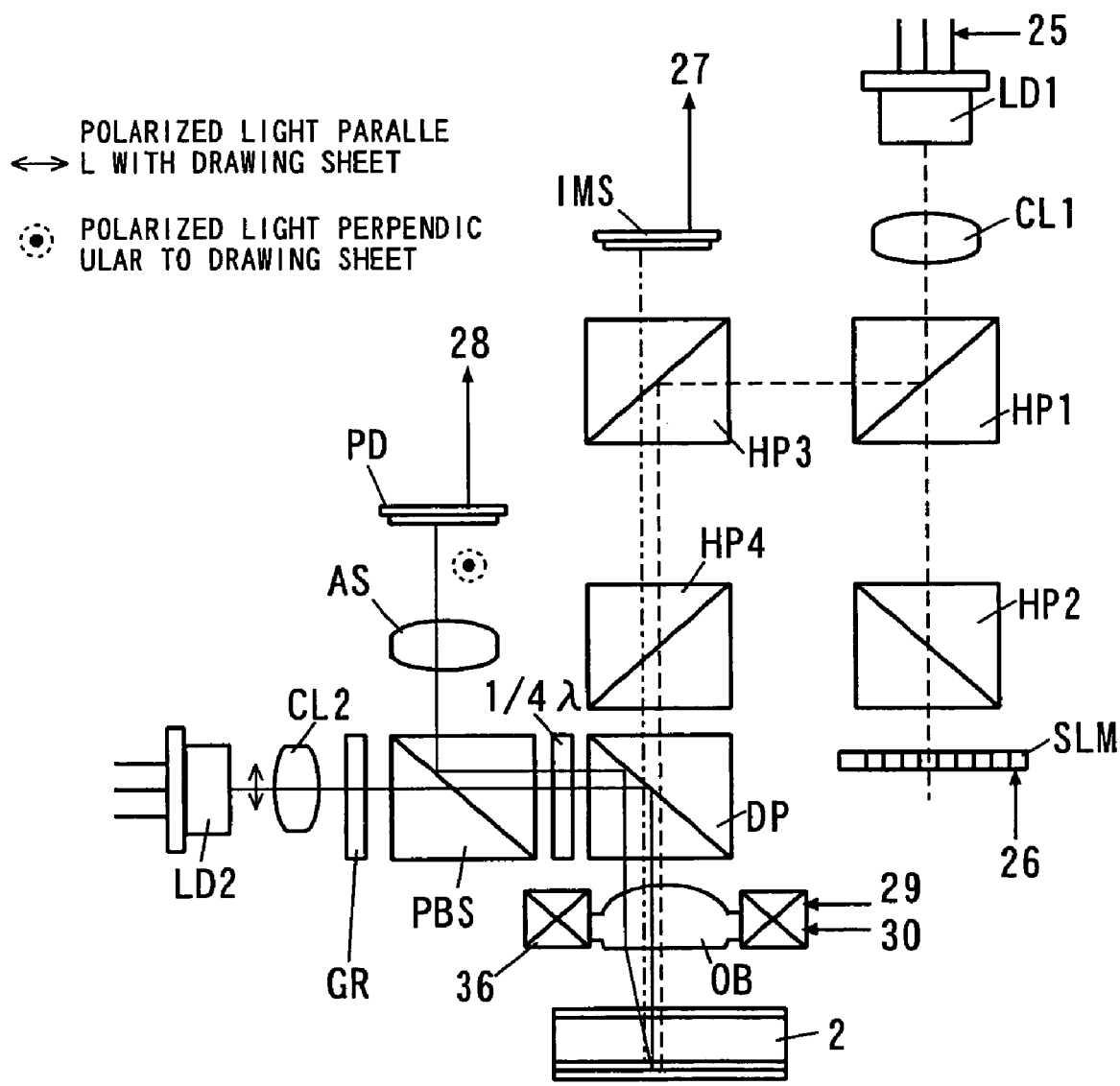

During reproduction, on the other hand, light is separated into a reference beam and a signal beam by the first half mirror HP1, in a manner similar to the recording, as shown in FIG. 22, however, holograms are reproduced only with the reference beam. By bringing the spatial light modulator SLM into a non-reflective state (light-permeative state), only reference light from the third half mirror HP3 passes through the dichroic prism DP and objective lens OB, and impinges on the hologram disk 2.

Since reproduced light (two-dot chain line) generated from the hologram disk 2 transmits the objective lens OB, dichroic prism DP, fourth half mirror prism HP4, and third half mirror prism HP3, and impinges on the image sensor IMS. The image sensor IMS delivers an output corresponding to an image formed by the reproduced light to the reproduced signal processing circuit 27 which generates a reproduced signal that is supplied to the controller circuit 50 for reproducing recorded page data. An image forming lens may be provided between the third half mirror prism HP3 and the image sensor IMS.

<Servo Control for Objective Lens>

In this embodiment, some of a plurality of beams are used to perform an x-direction servo which forces the objective lens to follow a track in the x-direction, while one of the plurality of beams is used to perform a y-direction servo for following the y-direction positioning mark M, to record and reproduce the aforementioned holograms. In the positioning servo control, light from the second laser source LD2 is divided into a plurality of servo sub-beams (servo beams) by the diffraction optical element GR, and calculations are made based on outputs of a four-divided photodetector PD which includes light receiving surfaces that receive return light from the respective servo beams, to generate a signal for driving a triaxial actuator (objective lens actuator 36) which can drive the objective lens along the x-, y-, and z-axes.

During both recording and reproduction, the second laser source DL2 for servo control emits coherent light at a different wavelength from the first laser source LD1, as shown in FIGS. 21 and 22. The servo light beam (thin solid line) from the second laser source DL2 is P-polarized light (double-head arrow indicating the parallelism to the drawing sheet) which is led along an optical path for servo detection including the second collimator lens CL2, polarization beam splitter PBS and ¼ wave plate ¼λ, but is combined with the signal beam and reference beam by the dichroic prism DP immediately before the objective lens OB. The servo light beam, after reflected by the dichroic prism DP, is converged by the objective lens OB, and impinges on the hologram disk 2. Return light of the servo light beam reflected from the hologram disk 2 back to the objective lens OB and then transformed by the ¼ wave plate ¼λ into S-polarized light (a black circle surrounded by a broken-line circle indicative of being perpendicular to the drawing sheet) which impinges on a light receiving surface of the servo photodetector PD along the normal thereof through the polarization beam splitter PBS and astigmatism element AS.

Figure 23:
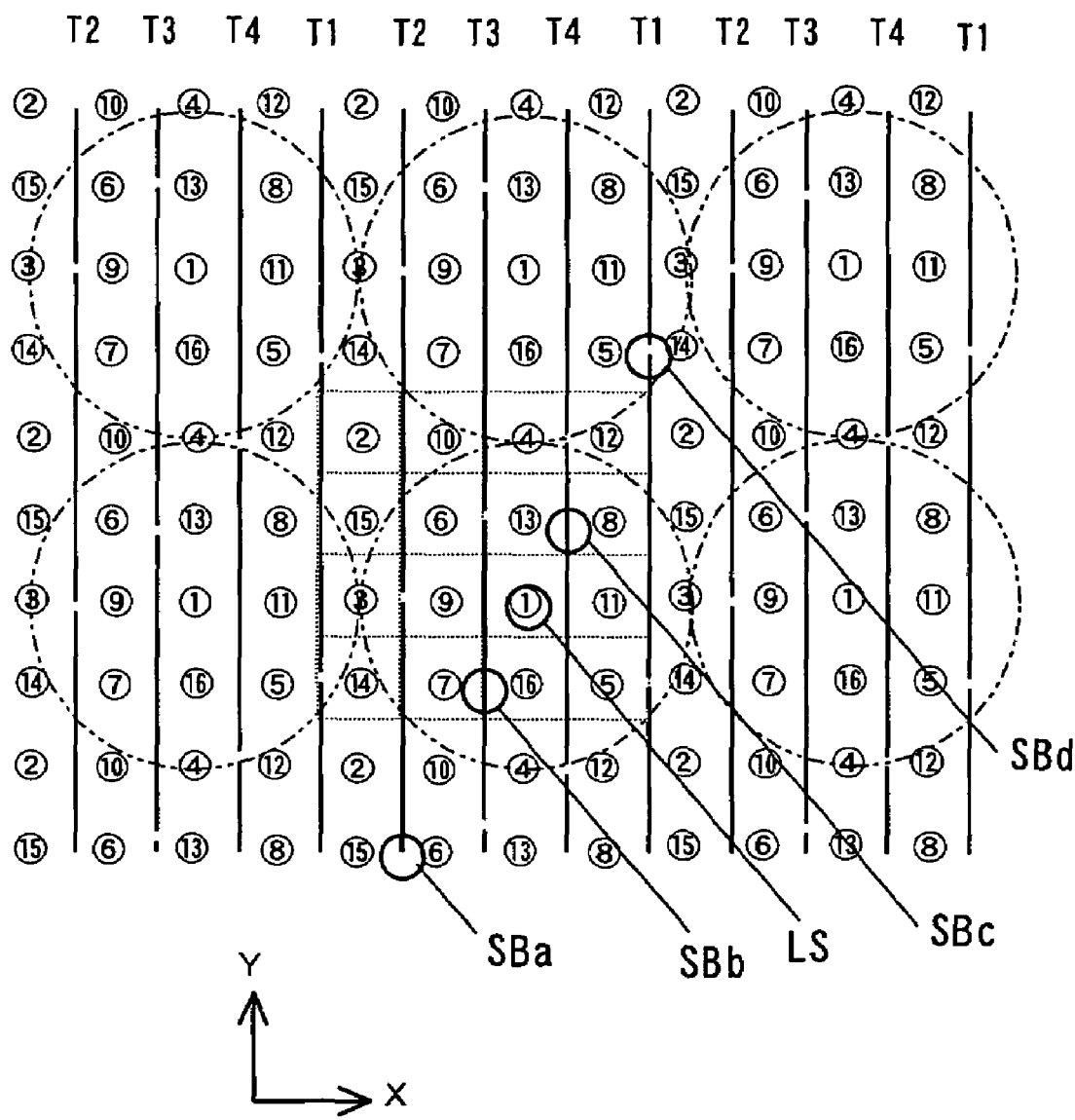
FIG. 23 is a plan view showing tracks on a hologram recording medium and a recording procedure according to one embodiment of the present invention.

FIG. 23 shows the state of servo beams on a reflective layer of a hologram disk when a hologram recording pitch, when holograms are recorded on the first layer, is four times as much as the minimum shift distance (similar to FIG. 4). The servo beams include, for example, four beams (SBa, SBb, SBc, SBd), and a recording light beam LS is irradiated between the servo beams SBa, SBb. The servo beams SBa, SBb, SBc, SBd, including the recording light beam LS are irradiated to tracks T2, T3, T4, T1, respectively, such that they stand in a line. A spot spacing of the servo beams is Px in the x-direction, and twice as much as Py2 in the y-direction. The spot of the recording light beam LS is positioned between the tracks T3, T4, and is therefore less affected by diffraction from adjacent tracks.

Figure 24:
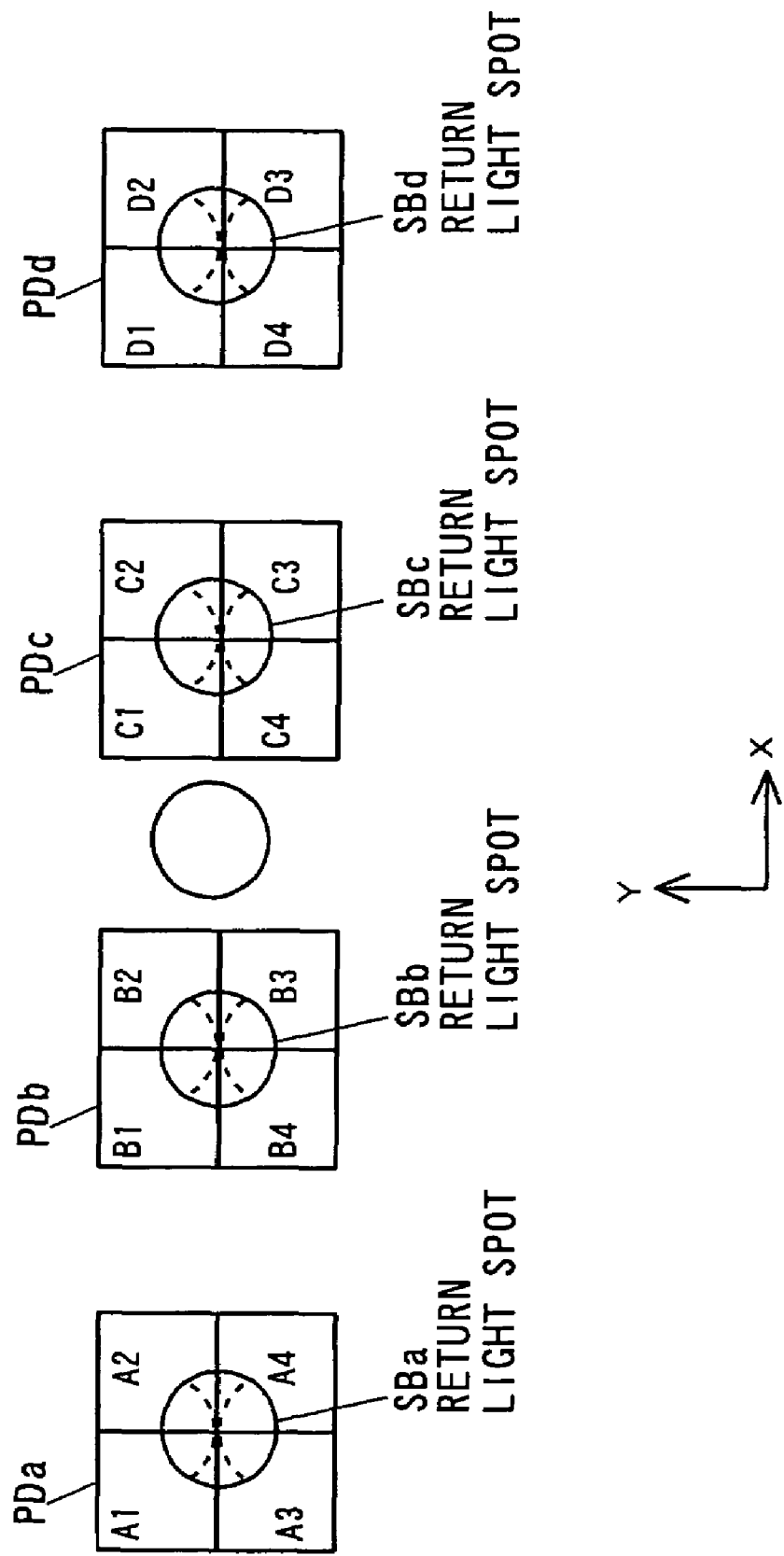
FIG. 24 is a plan view showing a photodetector in the pickup of the recording/reproducing apparatus for recording/reproducing information to/from a hologram disk according to one embodiment of the present invention.

On the other hand, the photodetector PD which receives the servo beams SBa, SBb, SBc, SBd includes light receiving elements PDa, PDb, PDc, PDd which have four four-divided light receiving surfaces, for example, as shown in FIG. 24. Four-division lines extend in directions corresponding to the x- and y-direction of the tracks on the medium. Each light spot, when focused, is set to be substantially in the shape of a circle centered at the intersection of the two division lines on each light receiving element.

The servo signal processing circuit 28 generates error signals in the x- and y-directions in accordance with respective output signals of the light receiving elements of the photodetector. The servo error signals are processed such that a push-pull signal is detected in the y-direction on a light receiving element which is receiving a beam that is converged on a track for which the y-direction servo control is conducted, and simultaneously, the other beams are processed such that a push-pull signal is detected in the x-direction, so that the x-direction servo control can be conducted. For example, assuming that respective output signals of the light receiving elements PDa, PDb, PDc, and PDd are (A1-A4), (B1-B4), (C1-C4), and (D1-D4), respectively, when the y-direction positioning mark is detected on the track T1 by the servo beam SBd, and the servo error signal in the x-direction is detected by the other beams as shown in FIG. 23, the servo error signals in the x-direction can be calculated by detecting the x-direction push-pull signals of the servo beams SBa, SBb, SBc. These error signals are supplied to the controller circuit 37. The calculation is made by:

X-direction servo error signal=$(A1+A4+B1+B4+C1+C4)-(A2+A3+B2+B3+C2C3)$.

Also, the servo error signal in the y-direction is generated by detecting the y-direction push-pull signal of the servo beam SBd. The calculation is made by:

Y-direction servo error signal=$(D1+D2)-(D3+D4)$

One or a plurality of the servo beams SBa, SBb, SBc may be used for the servo error signal(s) in the x-direction.

When the y-direction positioning mark on another track is used, a different light receiving element may be used for processing the servo error signal in the y-direction.

Though not particularly shown, a scheme generally used in an optical pickup is used for z-direction servo (focus servo). An astigmatism method or the like can be used from the fact that the photodetector PD for servo has four-divided light receiving surfaces. In other words, the servo scheme can mixedly use the push-pull method, and also use the astigmatism method.

EMBODIMENT

FIG. 23 shows a method of recording holograms on a hologram recording medium which employs the track structure of this embodiment. Encircled numbers indicate the multiplexing order in which holograms are recorded. Specifically, holograms recorded on the first layer are recorded at positions indicated by encircled numbers 1, while holograms recorded on the second layer are recorded at positions indicated by encircled numbers 2.

First, for recording holograms on the first layer (recording holograms at encircled numbers 1), the recording beam is irradiated between the tracks T3 and T4 by the x-direction servo. The x-direction servo error signal can be generated by the x-direction push-pull signals of the servo beams SBa, SBb, SBc (x-direction servo error signal=(A1+A4+B1+B4+C1+C4)−(A2+A3+B2+B3+C2+C3)). The y-direction servo error signal can be generated by the y-direction push-pull signal of the servo beam SBd (y-direction servo error signal=(D1+D2)−(D3+D4)). When the objective lens actuator is driven by these servo error signals, the objective lens can be fixed at all times at the position indicated by the encircled number 1 at which a hologram is to be recorded, even if the hologram recording medium is moved. For example, when the hologram recording medium has the shape of a disk, and even when it is rotated at a constant rotational speed or at a constant linear velocity, the objective lens of the pickup can be driven in the x- and y-directions to be fixed in a region in which a hologram is to be recorded with the light beam LS, so that a hologram can be precisely recorded at a particular position on the hologram recording medium.

After one hologram has been recorded, the y-direction servo is once opened, and the actuator is driven until the next y-direction positioning mark M is sensed for recording the next hologram. When the hologram recording medium is moving at all times in the y-direction, the actuator can be stopped. Since the x-direction servo is closed even in this state, the next y-direction positioning mark M can be detected if the y-direction push-pull signal of the servo beam SBd is observed. Then, at the time the y-direction push-pull signal of the servo beam SBd is detected, the servo is closed to position the recording beam.

For example, even when a more or less long time is required for recording holograms, this method may be used to record holograms which have a sufficient diffraction efficiency.

Since the y-direction positioning marks M formed on the track T1 are arranged at a pitch which is determined to be equal to the multiplicity (lower than the maximum multiplicity) of each layer, holograms can be recorded at regular intervals in accordance with a predefined rule.

A recording spacing in the x-direction is automatically determined only by conducting the x-direction servo which forces the beam to follow the track, provided that the track has a quadruple spiral structure. When the track structure is concentric, the beam may be moved to the next track (such that the recording beam lies between the tracks T3 and T4) at the address area or the like.

Next, for recording holograms on the second layer (recording holograms at positions indicated by encircled numbers 2), the recording beam is irradiated between the tracks T1 and T2 by the x-direction servo. The x-direction servo error signal can be generated by the x-direction push-pull signals of the servo beams SBa, SBb, SBc (x-direction servo error signal=(A1+A4+B1+B4+C1+C4)−(A2+A3+B2+B3+C2+C3)). The y-direction servo error signal can be generated by the y-direction push-pull signal of the servo beam SBd (y-direction servo error signal=(D1+D2)−(D3+D4)). When the objective lens actuator is driven by these servo error signals, the objective lens can be fixed at all times at the position indicated by the encircled number 2 at which a hologram is to be recorded, even if the hologram recording medium is moved.

Then, holograms are recorded on the third and fourth layers in a similar manner.

Thus, according to this embodiment, since the influence of diffraction light from a track can be avoided by recording holograms between adjacent tracks, a read can be successfully accomplished. A hologram recording time is set every number of multiplexing (layers), and the hologram recording time is maintained constant in each recording session (each layer).

OTHER EMBODIMENTS

Figure 25:
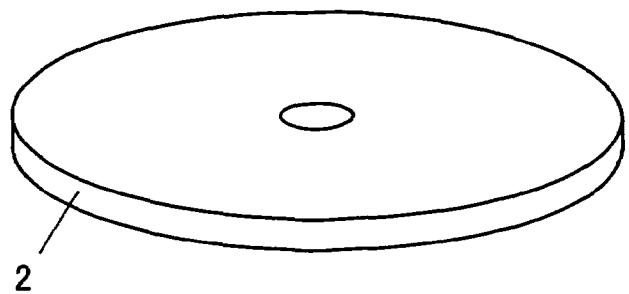
FIG. 25 is a perspective view showing a hologram disk according to an embodiment of the present invention.
Figure 26:
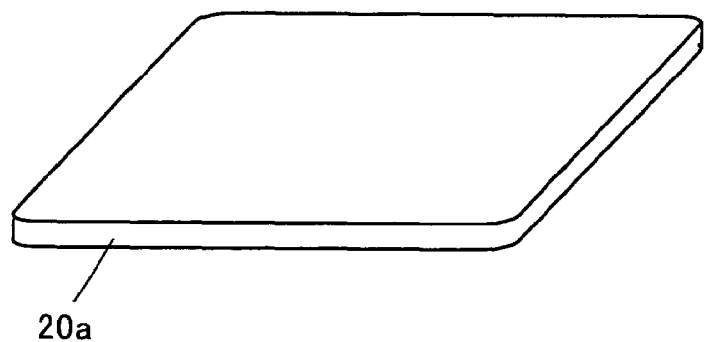
FIG. 26 is a perspective view showing a hologram optical card according to another embodiment of the present invention.
Figure 27:
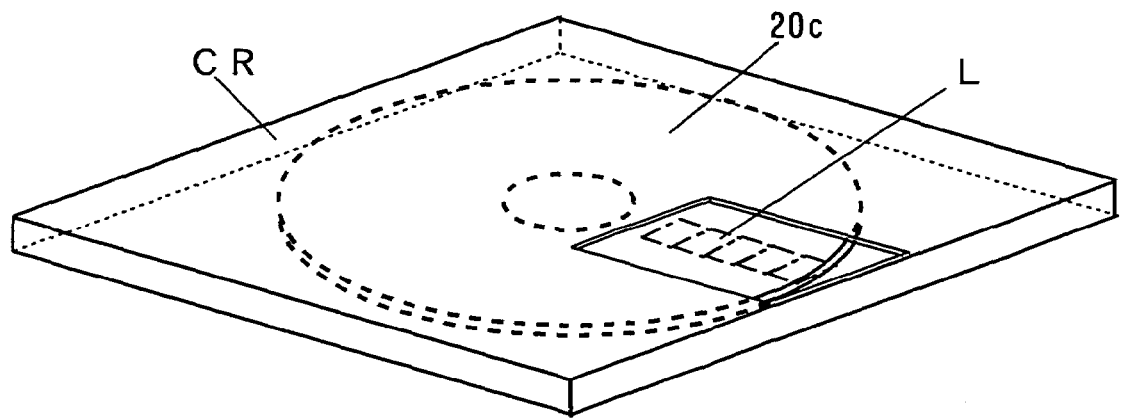
FIG. 27 is a perspective view showing a hologram recording medium of disk accommodated in a case according to another embodiment of the present invention.

Besides, though the foregoing embodiment includes the hologram disk 2 as shown in FIG. 25 as a recording medium, the shape of the hologram recording medium is not limited to a disk. For example, the embodiment includes as shown in FIG. 26 an optical card 20a of a rectangle parallel flat board made of plastics and the like and having. In such optical card, the guide track may be formed on the substrate spirally or spiroarcually or concentrically with respect to the center e.g., of gravity of the substrate. Further, the guide track may be formed in parallel on the substrate. Also, the hologram recording medium can be made in a variety of shapes such as a disk, a card, and the like. As shown in FIG. 27, a discoidal hologram recording medium 20c including the recording layer can be housed in a cartridge CR having a shatter (not shown) capable of opening and closing a window through which the pickup is accessable.

In the recording method of the present invention, if there is a layer which is not used for recording, holograms can be recorded while skipping this layer. Specifically, even if four layers are available for recording, for example, only the first, second, and fourth layers are used without using the third layer, and the recording is started from the fourth layer. Next, the recording is made on the second and first layers, or alternatively the recording is started from the first layer, and then the recording is made on the second and fourth layers. In this way, a high signal quality can be maintained like the foregoing.

In the recording method for the hologram recording medium of the present invention, the recording may be performed over the entire surface of the hologram recording medium, or may be performed block by block, by way of example. Specifically, the medium is divided into a plurality of blocks, such that the recording may be performed sequentially on a layer-by-layer basis in one block, and the recording may be performed similarly in a different block, and may be performed in another different block.

For implementing the recording method as the present invention, the hologram recording medium can be provided with an information identification region which can be used to identify the order of recording on the recording layer. This information identification region may be formed at any position of the medium, and may be formed at any position in the horizontal direction (in a central, marginal, outer peripheral or inner peripheral region). For example, convexoconcave may be embossed on the substrate as information pits in an outer peripheral or inner peripheral region of the hologram recording medium, or may be recorded on the recording layer itself as recording information. Further, even when the hologram recording medium is of the type contained in a cartridge, the cartridge may be formed with convexoconcave, an information identification hole, or the like. In this way, information is previously read from the information identification region before starting the recording to select a recording procedure, thereby making it possible to select an optimal recording method in accordance with this information.

Further, for implementing the recording method of the present invention, the recording/reproducing apparatus can be provided with a recording method identifying means for reading the identification information from the hologram recording medium as mentioned above to determine a recording procedure. The recording scheme identifying method may be a means which can recognize the transmittance, reflectivity, or the like of light directed to a predetermined region of the medium, or information pits such as an embossed pattern formed on the substrate (for example, a photodetector and the like), or a means which can recognize convexoconcave or identification hole formed on the cartridge or the like. In this way, the identification information can be read from the hologram recording medium to determine a recording procedure, thereby selecting an optimal recording method.

According to the foregoing embodiment, the y-direction positioning marks M are formed on tracks at a first pitch set to be equal to or larger than a minimum shift distance of holograms, and the spacing of the y-direction positioning marks M formed on adjacent tracks is set as a function of the minimum shift distance of holograms, so that a plurality of layers can be set. By recording holograms on a layer-by-layer basis, the center of a recording mark does not exist between adjacent tracks to be recorded or between recording marks, thus making it possible to perform the recording with constant recording power under optimal recording conditions at all times. It is therefore possible to ensure a sufficient intensity of reproduced signal. Moreover, when the recording is performed on a block-by-block basis, the recording can be performed faster. Further, when the hologram recording medium has an information identification region which can be used to identify a recording order to the recording layers, a recording procedure can be selected by previously reading information from the information identification region, thus readily selecting optimal recording conditions.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2004-36545 which is hereby incorporated by reference.

What is claimed is:

1. A hologram recording for recording or reproducing information with light irradiated thereto, comprising:
   a recording layer made of a photo-sensitive material;
   a reflective layer disposed on the opposite side of said recording layer from a light irradiated side;
   tracks formed on said reflective layer such that said tracks are spaced apart by a first pitch from each other to extend without intersection; and
   positioning marks formed on said reflective layer such that said positioning marks are spaced apart by a second pitch from each other in a direction in which said tracks extend, said second pitch being a function of said first pitch.

2. A hologram recording medium according to claim 1, wherein said positioning marks are placed on said tracks.

3. A hologram recording medium according to claim 1, wherein said positioning marks are placed between said tracks.

4. A hologram recording medium according to claim 1, wherein said second pitch of said positioning marks is substantially an integer multiple of said first pitch.

5. A hologram recording medium according to claim 1, wherein said positioning marks for a pair of adjacent ones of said tracks are placed at said first pitch.

6. A hologram recording medium according to claim 1, wherein a light beam passing through said recording layer from an objective lens and focused on said tracks has a spot diameter equal to a diffraction limit which is determined by the wavelength of the light beam and the numerical aperture of said objective lens.

7. A hologram recording medium according to claim 1, wherein said substrate is a disk, and said tracks are formed on said substrate spirally, or spiro-arcually, or concentrically with respect to the center of said substrate.

8. A hologram recording medium according to claim 1, wherein said tracks are formed in parallel on said substrate.

9. A hologram recording medium according to claim 1, wherein said first pitch is set at a value determined from a center-to-center distance of a pair of the holograms in closest proximity of a plurality of holograms formed on said recording layer.

10. A hologram recording medium according to claim 1, wherein said reflective layer and said recording layer are laminated with intervention of a separation layer.

11. A recording/reproducing apparatus for a hologram recording medium which is carried by a substrate and has a recording layer for recording or reproducing information with light irradiated thereto, wherein:
    said hologram recording medium comprises a recording layer made of a photo-sensitive material, a reflective layer disposed on the opposite side of said recording layer from a light irradiated side, tracks formed on said reflective layer such that said tracks are spaced apart by a first pitch from each other to extend without intersection, and positioning marks formed on said reflective layer such that said positioning marks are spaced apart by a second pitch from each other in a direction in which said tracks extend, said second pitch being a function of said first pitch; and
    said recording/reproducing apparatus includes means for irradiating a light beam to detect said positioning marks, and means for moving a position irradiated with said light beam in a direction having a component in a direction in which said tracks extend.

12. A recording/reproducing apparatus according to claim 11, further comprising:
- a light source for generating a coherent reference beam;
- a holder for mountably holding said hologram recording medium;
- a signal light generator including a spatial light modulator for spatially modulating a reference light in accordance with recording information to generate a signal beam;
- an interferer for irradiating the reference beam and the signal beam toward the reflective layer of said hologram recording medium to form a region of a diffraction grating by a light interference pattern within the recording layer of said hologram recording medium, and for irradiating the reference beam toward said diffraction grating region to generate a reproduced wave corresponding to the signal beam;
- a separator for separating return light of the reference light reflected from the reflective layer back to said interferer from the reproduced wave; and
- detector for detecting recorded information, the image of which is formed by the reproduced wave.

13. A reproducing apparatus for a hologram recording medium which is carried by a substrate and has a recording layer for recording or reproducing information with light irradiated thereto, wherein:
- said hologram recording medium comprises a recording layer made of a photo-sensitive material, a reflective layer disposed on the opposite side of said recording layer from a light irradiated side, tracks formed on said reflective layer such that said tracks are spaced apart by a first pitch from each other to extend without intersection, and positioning marks formed on said reflective layer such that said positioning marks are spaced apart by a second pitch from each other in a direction in which said tracks extend, said second pitch being a function of said first pitch; and
- said reproducing apparatus includes means for irradiating a light beam to detect said positioning marks, and means for moving a position irradiated with said light beam in a direction having a component in a direction in which said tracks extend.

14. A recording method for a hologram recording medium carried by a substrate and having a recording layer for recording or reproducing information with light irradiated thereto, said method comprising the step of temporally overlapping one or more layers each including a plurality of holograms to record a group of holograms on each of said layers, wherein the holograms are recorded on each of said layers at a density lower than a maximum recording density, wherein:
- said hologram recording medium comprises a recording layer made of a photo-sensitive material, a reflective layer disposed on the opposite side of said recording layer from a light irradiated side, tracks formed on said reflective layer such that said tracks are spaced apart by a first pitch from each other to extend without intersection, and positioning marks formed on said reflective layer such that said positioning marks are spaced apart by a second pitch from each other in a direction in which said tracks extend, said second pitch being a function of said first pitch; and
- said method further comprises the steps of irradiating a light beam to detect said positioning marks, and moving a position irradiated with said light beam in a direction having a component in a direction in which said tracks extend, wherein the holograms are sequentially recorded from a site of said recording layer which is least frequently irradiated with light.

15. A recording method for a hologram recording medium according to claim 14, wherein said hologram recording medium has an information identification region including information indicative of an order in which said recording layer is recorded, and said method further includes the step of previously reading the information from said information identification region to select a recording procedure.

* * * * *